United States Patent
Olivieri et al.

(10) Patent No.: US 12,142,285 B2
(45) Date of Patent: Nov. 12, 2024

(54) QUANTIZING SPATIAL COMPONENTS BASED ON BIT ALLOCATIONS DETERMINED FOR PSYCHOACOUSTIC AUDIO CODING

(71) Applicant: QUALCOMM Incorporated, San Diego, CA (US)

(72) Inventors: Ferdinando Olivieri, San Diego, CA (US); Taher Shahbazi Mirzahasanloo, San Diego, CA (US); Nils Günther Peters, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 16/907,934

(22) Filed: Jun. 22, 2020

(65) Prior Publication Data

US 2020/0402522 A1 Dec. 24, 2020

Related U.S. Application Data

(60) Provisional application No. 62/865,853, filed on Jun. 24, 2019.

(51) Int. Cl.
*G10L 19/032* (2013.01)
*G10L 19/002* (2013.01)
(Continued)

(52) U.S. Cl.
CPC .......... *G10L 19/032* (2013.01); *G10L 19/002* (2013.01); *G10L 19/008* (2013.01);
(Continued)

(58) Field of Classification Search
CPC ............................ G10L 19/032; G10L 19/002
See application file for complete search history.

(56) References Cited

U.S. PATENT DOCUMENTS 5,651,090 A 7/1997 Moriya et al.
9,626,973 B2 4/2017 Taleb et al.
(Continued)

FOREIGN PATENT DOCUMENTS

CN 102089808 A 6/2011
CN 102124517 A 7/2011
(Continued)

OTHER PUBLICATIONS

"3rd Generation Partnership Project; Technical Specification Group Services and System Aspects; Virtual Reality (VR) Media Services Over 3GPP (Release 15)",3GPP Draft, S4-170494 TR 26.918 Virtual Reality (VR) Media Services Over 3GPPV0.7.0 Clean, 3rd Generation Partnership Project (3GPP), Mobile Competence Centre, 650, Route Des Lucioles, F-06921 Sophi, Apr. 28, 2017 (Apr. 28, 2017), XP051269716, pp. 1-58, Retrieved from the Internet: URL: http://www.3gpp.org/ftp/tsg_sa/WG4_CODEC/TSGS4_93/Docs/ [retrieved on Apr. 28, 2017] Section 4.3.3.2, Example 4.19.
(Continued)

*Primary Examiner* — Shaun Roberts
(74) *Attorney, Agent, or Firm* — QUALCOMM Incorporated; Espartaco Diaz Hidalgo

(57) ABSTRACT

In general, techniques are described for quantizing spatial components based on bit allocations determined for psychoacoustic audio coding. A device comprising a memory and one or more processors may perform the techniques. The memory may store a bitstream including an encoded foreground audio signal and a corresponding quantized spatial component. The one or more processors may perform psychoacoustic audio decoding with respect to the encoded foreground audio signal to obtain a foreground audio signal, and determine, when performing the psychoacoustic audio decoding, a first bit allocation for the encoded foreground audio signal. The one or more processors may also deter-
(Continued)

mine, based on the first bit allocation, a second bit allocation, and dequantize, based on the second bit allocation, the quantized spatial component to obtain a spatial component. The one or more processors may reconstruct, based on the foreground audio signal and the spatial component, scene-based audio data.

23 Claims, 10 Drawing Sheets

(51) Int. Cl.
  *G10L 19/008* (2013.01)
  *G10L 19/16* (2013.01)
  *H04L 65/70* (2022.01)
  *H04L 65/75* (2022.01)

(52) U.S. Cl.
  CPC ............ *G10L 19/167* (2013.01); *H04L 65/70* (2022.05); *H04L 65/75* (2022.05)

(56) References Cited

U.S. PATENT DOCUMENTS

| | | | |
|---|---|---|---|
| 9,852,737 | B2 | 12/2017 | Kim et al. |
| 9,959,880 | B2 | 5/2018 | Peters et al. |
| 10,075,802 | B1 | 9/2018 | Kim et al. |
| 10,657,974 | B2 | 5/2020 | Kim et al. |
| 10,770,087 | B2 | 9/2020 | Kim et al. |
| 2003/0006916 | A1* | 1/2003 | Takamizawa ......... G10L 19/173 341/61 |
| 2007/0168197 | A1 | 7/2007 | Vasilache |
| 2007/0269063 | A1 | 11/2007 | Goodwin et al. |
| 2008/0027709 | A1* | 1/2008 | Baumgarte ......... G10L 19/0208 704/200.1 |
| 2008/0136686 | A1 | 6/2008 | Feiten |
| 2008/0252510 | A1* | 10/2008 | Jung ..................... G10L 19/032 341/200 |
| 2010/0017204 | A1* | 1/2010 | Oshikiri .................. G10L 19/00 704/222 |
| 2011/0170711 | A1* | 7/2011 | Rettelbach .......... G10L 19/0204 381/98 |
| 2011/0249821 | A1 | 10/2011 | Jaillet et al. |
| 2013/0275140 | A1 | 10/2013 | Kim et al. |
| 2014/0249827 | A1 | 9/2014 | Sen et al. |
| 2014/0358557 | A1* | 12/2014 | Sen ....................... G10L 19/008 704/500 |
| 2014/0358565 | A1 | 12/2014 | Peters et al. |
| 2015/0025895 | A1 | 1/2015 | Schildbach |
| 2015/0255076 | A1 | 9/2015 | Fejzo |
| 2015/0271621 | A1* | 9/2015 | Sen ........................... H04S 7/30 381/303 |
| 2015/0332681 | A1 | 11/2015 | Kim et al. |
| 2015/0340044 | A1* | 11/2015 | Kim ........................ H04S 3/008 381/23 |
| 2015/0358810 | A1 | 12/2015 | Chao et al. |
| 2016/0005407 | A1* | 1/2016 | Friedrich .............. G10L 19/167 381/22 |
| 2016/0007132 | A1 | 1/2016 | Peters et al. |
| 2016/0064005 | A1 | 3/2016 | Peters et al. |
| 2016/0093311 | A1 | 3/2016 | Kim et al. |
| 2016/0104493 | A1 | 4/2016 | Kim et al. |
| 2016/0104494 | A1 | 4/2016 | Kim et al. |
| 2018/0013446 | A1 | 1/2018 | Milicevic et al. |
| 2018/0082694 | A1 | 3/2018 | Kim |
| 2019/0007781 | A1 | 1/2019 | Peters et al. |
| 2019/0103118 | A1 | 4/2019 | Atti et al. |
| 2019/0259398 | A1 | 8/2019 | Buethe et al. |
| 2019/0371348 | A1 | 12/2019 | Shahbazi Mirzahasanloo |
| 2020/0013414 | A1 | 1/2020 | Thagadur Shivappa et al. |
| 2020/0402519 | A1 | 12/2020 | Olivieri |

FOREIGN PATENT DOCUMENTS

| | | |
|---|---|---|
| CN | 104285451 A | 1/2015 |
| CN | 104471641 A | 3/2015 |
| CN | 105593931 A | 5/2016 |
| EP | 3067885 A1 | 9/2016 |
| WO | 2015000819 A1 | 1/2015 |
| WO | 2015176003 A1 | 11/2015 |
| WO | 2017066312 A1 | 4/2017 |

OTHER PUBLICATIONS

"Advanced Audio Distribution Profile Specification," version 1.3.1, published Jul. 14, 2015, 35 pp.
Audio: "Call for Proposals for 3D Audio", International Organisation for Standardisation Organisation Internationale De Normalisation ISO/IEC JTC1/SC29/WG11 Coding of Moving Pictures and Audio, ISO/IEC JTC1/SC29/WG11/ N13411, Geneva, Jan. 2013, pp. 1-20.
"Bluetooth Core Specification v 5.0," published Dec. 6, 2016 accessed from https://www.bluetooth.com/specifications, pp. 1-5.
Boehm J., et al., "Scalable Decoding Mode for MPEG 3D Audio HOA", 108. MPEG Meeting; Mar. 31, 2014-Apr. 4, 2014; Valencia; (Motion Picture Expert Group or ISO/IEC JTC1/SC29/WG11), No. m33195, Mar. 26, 2014 (Mar. 26, 2014), 12 p. XP030061647 [A] 16-18 * p. 1, section 1, paragraph 3 *, p. 2, line 21—p. 6, line 30, Retrieved from the Internet: URL: http://phenix.int-evry.fr/mpeg/doc_enduser/documents/108_Valencia/wg11/m33195-v1-m33195_ScalableHOA.docx.zipm33195_ScalableHOA.docx [retrieved on May 5, 2014] Section 1, Section 2.1.1.
ETSI TS 103 589 V1.1.1, "Higher Order Ambisonics (HOA) Transport Format", Jun. 2018, 33 pages.
Herre J., et al., "MPEG-H 3D Audio—The New Standard for Coding of Immersive Spatial Audio", IEEE Journal Of Selected Topics In Signal Processing, vol. 9, No. 5, Aug. 1, 2015 (Aug. 1, 2015), pp. 770-779, XP055243182, US ISSN: 1932-4553, DOI: 10.1109/JSTSP.2015.2411578.
Hollerweger F., "An Introduction to Higher Order Ambisonic," Oct. 2008, p. 13, Accessed online [Jul. 8, 2013].
"Information technology—High Efficiency Coding and Media Delivery in Heterogeneous Environments—Part 3: 3D Audio," ISO/IEC JTC 1/SC 29, ISO/IEC DIS 23008-3, Jul. 25, 2014, 433 Pages.
"Information technology—High Efficiency Coding and Media Delivery in Heterogeneous Environments—Part 3: 3D Audio", ISO/IEC JTC 1/SC 29/WG11, ISO/IEC 23008-3, 201x(E), Oct. 12, 2016, 797 Pages.
"Information technology—High efficiency coding and media delivery in heterogeneous environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 pp.
International Search Report and Written Opinion—PCT/US2020/039162—ISA/EPO—dated Sep. 28, 2020.
ISO/IEC/JTC: "ISO/IEC JTC1/SC 29 N ISO/IEC CD 23008-3 Information technology—High efficiency coding and media delivery in heterogeneous environments—Part 3: 3D audio," Apr. 4, 2014 (Apr. 4, 2014), 337 Pages, XP055206371, Retrieved from the Internet: URL:http://www.iso.org/iso/iso_catalogue/catalogue_tc/catalogue_to_browse.htm?commid=45316 [retrieved on Aug. 5, 2015].
Poletti M.A., "Three-Dimensional Surround Sound Systems Based on Spherical Harmonics", The Journal of the Audio Engineering Society, vol. 53, No. 11, Nov. 2005, pp. 1004-1025.
Schonefeld V., "Spherical Harmonics", Jul. 1, 2005, XP002599101, 25 Pages, Accessed online [Jul. 9, 2013] at URL:http://heim.c-otto.de/~volker/prosem_paper.pdf.
Sen D., et al., "Efficient Compression and Transportation of Scene Based Audio for Television Broadcast", Jul. 18, 2016 (Jul. 18, 2016), XP055327771, 8 pages, Retrieved from the Internet: URL: http://www.aes.org/tmpFiles/elib/20161209/18329.pdf. [retrieved on Dec. 9, 2016] paragraphs [0002], [0003]; figures 3,4.
Sen D., et al., "RM1-HOA Working Draft Text", 107. MPEG Meeting, Jan. 13, 2014-Jan. 17, 2014, San Jose, (Motion Picture Expert Group or ISO/IEC JTC1/SC29/WG11), No. m31827, Jan.

(56) References Cited

OTHER PUBLICATIONS 11, 2014 (Jan. 11, 2014), 83 Pages, XP030060280, p. 11, paragraph 5.2.4-paragraph 5.2.5 p. 16, paragraph 6.1.10—p. 17; Figure 4 p. 18, paragraph 6.3—p. 22, Paragraph 6.3.2.2 p. 64, paragraph B.1—p. 66, Paragraph B.2.1; figures B.1, B.2 p. 70, paragraph B.2.1.3—p. 71 p. 74, paragraph B.2.4.1—p. 75, Paragraph B.2.4.2.
Sen D., et al., "Technical Description of the Qualcomm's HoA Coding Technology for Phase II", 109. MPEG Meeting; Jul. 7, 2014-Nov. 7, 2014; Sapporo; (Motion Picture Expert Group or ISO/IEC JTC1/SC29/ WG11), No. m34104, Jul. 2, 2014 (Jul. 2, 2014), 4 Pages, XP030062477, figure 1.
Sen D (Qualcomm)., et al., "Thoughts on Layered/Scalable Coding for HOA the Signal", 110. MPEG Meeting, Oct. 20, 2014-Oct. 24, 2014; Strasbourg, (Motion Picture Expert Group or Iso/Iec JTC1/SC29/WG11), No. m35160, Oct. 15, 2014 (Oct. 15, 2014), XP030063532, 5 Pages, figure 1, Retrieved from the Internet: URL: http://phenix.int-evry.ir/mpeg/doc_enduser/documents/110_Strasbourg/wg11/m35160-v1-m35160.zip m35160.docx [retrieved on Oct. 15, 2014] The Whole Document.
Yang D., "High Fidelity Multichannel Audio Compression", Jan. 1, 2002 (Jan. 1, 2002), 211 Pages, XP055139610. Retrieved from the Internet : URL: http://search.proquest.com/docview/305523844. section 5.1.
U.S. Appl. No. 16/907,771, filed Jun. 22, 2020, 72 Pages.
U.S. Appl. No. 16/907,969, filed Jun. 22, 2020, 73 Pages.
U.S. Appl. No. 16/908,032, filed Jun. 22, 2020, 4 Pages.
Peters N., et al., "Scene-Based Audio Implemented with Higher Order Ambisonics (Hoa)", SMPTE Motion Imaging Journal, Nov.-Dec. 2016, 13 pages.
Shankar Shivappa, et al., "Efficient, Compelling and Immersive VR Audio Experience Using Scene Based Audo/Higher Order Ambisonics", AES conference paper, presented on the conference on Audio for Virtual and Augmented Reality, Los Angeles, CA, USA, p. 1-10, Sep. 30-Oct. 1 (Year:2016).
International Preliminary Report on Patentability—PCT/US2020/039162, The International Bureau of WIPO—Geneva, Switzerland, dated Jan. 6, 2022 10 Pages.
Notice of Allowance from U.S. Appl. No. 16/907,969 mailed Feb. 16, 2022, 12 pp.
Appeal Brief from U.S. Appl. No. 16/907,771, filed Jun. 7, 2024, 31 pages.
Ma N., et al., "Combining Speech Fragment Decoding and Adaptive Noise Floor Modeling", in IEEE Transactions on Audio, Speech, and Language Processing, vol. 20, No. 3, pp. 818-827, Mar. 2012, DOI: 10.1109/TASL.2011.2165945. (Year: 2012).
Non-Final Office Action from U.S. Appl. No. 16/907,771 dated Aug. 8, 2022, 46 pages.
Response to Non-Final Office Action from U.S. Appl. No. 16/907,771, field Nov. 7, 2022, 14 pages.
Final Office Action from U.S. Appl. No. 16/907,771 dated Jan. 27, 2023, 56 pages.
Response to Final Office Action from U.S. Appl. No. 16/907,771, filed Mar. 16, 2023, 17 pages.
Advisory Action from U.S. Appl. No. 16/907,771 dated Apr. 5, 2023, 7 pages.
Notice of Appeal and Pre-Appeal Brief Request for Review from U.S. Appl. No. 16/907,771, field Apr. 27, 2023, 6 pages.
Notice of Panel Decision from Pre-Appeal Brief Review from U.S. Appl. No. 16/907,771 dated May 18, 2023, 2 pages.
Appeal Brief from U.S. Appl. No. 16/907,771, filed Jun. 26, 2023, 37 pages.
Corrected Advisory Action from U.S. Appl. No. 16/907,771 dated Jul. 25, 2023, 3 pages.
Non-Final Office Action from U.S. Appl. No. 16/907,771 dated Sep. 13, 2023, 51 pages.
Response to Non-Final Office Action from U.S. Appl. No. 16/907,771, filed Dec. 13, 2023, 14 pages.
Final Office Action from U.S. Appl. No. 16/907,771 dated Jan. 16, 2024, 53 pages.
Response to Final Office Action from U.S. Appl. No. 16/907,771, filed Mar. 6, 2024, 15 pages.
Advisory Action from U.S. Appl. No. 16/907,771 dated Mar. 18, 2024, 5 pages.
Notice of Appeal from U.S. Appl. No. 16/907,771, filed Apr. 8, 2024, 1 page.
Non-Final Office Action received for U.S. Appl. No. 16/908,032, dated May 18, 2022, 41 Pages.
Zamani S., et al., "Spatial Audio Coding without Recourse to Background Signal Compression", ICASSP 2019-2019 IEEE International Conference on Acoustics, Speech and Signal Processing (ICASSP), 2019, pp. 720-724, DOI: 10.1109/ICASSP.2019.8682315. (Year: 2019).

* cited by examiner

QUANTIZING SPATIAL COMPONENTS BASED ON BIT ALLOCATIONS DETERMINED FOR PSYCHOACOUSTIC AUDIO CODING

This application claims the benefit of U.S. Provisional Application No. 62/865,853, entitled "QUANTIZING SPATIAL COMPONENTS BASED ON BIT ALLOCATIONS DETERMINED FOR PSYCHOACOUSTIC AUDIO CODING," filed Jun. 24, 2019, the entire contents of which are hereby incorporated by reference as if set forth in their entirety.

TECHNICAL FIELD

This disclosure relates to audio data and, more specifically, coding of audio data.

BACKGROUND

Psychoacoustic audio coding refers to a process whereby audio data is compressed using psychoacoustic models. The psychoacoustic audio coding may leverage limitations in a human auditory system to compress the audio data, taking into account limitations that occur due to spatial masking (e.g., two audio sources at the same location where one of the auditory sources masks, in terms of loudness, another auditory source), temporal masking (e.g., where one audio source masks, in terms of loudness, another auditory source), etc. The psychoacoustic models may attempt to model the human auditory system to identify masked or other portions of the soundfield that are redundant, masked, or otherwise incapable of being perceived by the human auditory system. The psychoacoustic audio coding may also perform lossless compression by entropy encoding the audio data.

SUMMARY

In general, techniques are described for quantizing spatial components based on bit allocations determined for psychoacoustic audio coding.

In one example, various aspects of the techniques are directed to a device configured to encode scene-based audio data, the device comprising: a memory configured to store scene-based audio data; and one or more processors configured to: perform spatial audio encoding with respect to the scene-based audio data to obtain a foreground audio signal and a corresponding spatial component, the spatial component defining spatial characteristics of the foreground audio signal; perform psychoacoustic audio encoding with respect to the foreground audio signal to obtain an encoded foreground audio signal; determine, when performing psychoacoustic audio encoding with respect to the foreground audio signal, a first bit allocation for the foreground audio signal; determine, based on the first bit allocation for the foreground audio signal, a second bit allocation for the spatial component; quantize, based on the second bit allocation for the spatial component, the spatial component to obtain a quantized spatial component; and specify, in a bitstream, the encoded foreground audio signal and the quantized spatial component.

In another example, various aspects of the techniques are directed to a method of encoding scene-based audio data, the method comprising: performing spatial audio encoding with respect to the scene-based audio data to obtain a foreground audio signal and a corresponding spatial component, the spatial component defining spatial characteristics of the foreground audio signal; performing psychoacoustic audio encoding with respect to the foreground audio signal to obtain an encoded foreground audio signal; determining, when performing psychoacoustic audio encoding with respect to the foreground audio signal, a first bit allocation for the foreground audio signal; determining, based on the first bit allocation for the foreground audio signal, a second bit allocation for the spatial component; quantizing, based on the second bit allocation for the spatial component, the spatial component to obtain a quantized spatial component; and specifying, in a bitstream, the encoded foreground audio signal and the quantized spatial component.

In another example, various aspects of the techniques are directed to a device configured to encode scene-based audio data, the device comprising: means for performing spatial audio encoding with respect to the scene-based audio data to obtain a foreground audio signal and a corresponding spatial component, the spatial component defining spatial characteristics of the foreground audio signal; means for performing psychoacoustic audio encoding with respect to the foreground audio signal to obtain an encoded foreground audio signal; means for determining, when performing psychoacoustic audio encoding with respect to the foreground audio signal, a first bit allocation for the foreground audio signal; means for determining, based on the first bit allocation for the foreground audio signal, a second bit allocation for the spatial component; means for quantizing, based on the second bit allocation for the spatial component, the spatial component to obtain a quantized spatial component; and means for specifying, in a bitstream, the foreground audio signal and the quantized spatial component.

In another example, various aspects of the techniques are directed to a non-transitory computer-readable storage medium having stored thereon instructions that, when executed, cause one or more processors to: perform spatial audio encoding with respect to scene-based audio data to obtain a foreground audio signal and a corresponding spatial component, the spatial component defining spatial characteristics of the foreground audio signal; perform psychoacoustic audio encoding with respect to the foreground audio signal to obtain an encoded foreground audio signal; determine, when performing psychoacoustic audio encoding with respect to the foreground audio signal, a first bit allocation for the foreground audio signal; determine, based on the first bit allocation for the foreground audio signal, a second bit allocation for the spatial component; quantize, based on the second bit allocation for the spatial component, the spatial component to obtain a quantized spatial component; and specify, in a bitstream, the foreground audio signal and the quantized spatial component.

In another example, various aspects of the techniques are directed to a device configured to decode a bitstream representative of encoded scene-based audio data, the device comprising: a memory configured to store the bitstream, the bitstream including an encoded foreground audio signal and a corresponding quantized spatial component that defines spatial characteristics of the foreground audio signal; and one or more processors configured to: perform psychoacoustic audio decoding with respect to the encoded foreground audio signal to obtain a foreground audio signal; determine, when performing the psychoacoustic audio decoding with respect to the encoded foreground audio signal, a first bit allocation for the encoded foreground audio signal; determine, based on the first bit allocation for the encoded foreground audio signal, a second bit allocation for the quantized spatial component; dequantize, based on the second bit allocation for the quantized spatial component, the quantized spatial component to obtain a spatial component; and reconstruct, based on the foreground audio signal and the spatial component, the scene-based audio data.

In another example, various aspects of the techniques are directed to a method of decoding a bitstream representative of scene-based audio data, the method comprising: obtaining, from the bitstream, an encoded foreground audio signal and a corresponding quantized spatial component that defines the spatial characteristics of the encoded foreground audio signal; performing psychoacoustic audio decoding with respect to the encoded foreground audio signal to obtain a foreground audio signal; determining, when performing psychoacoustic audio decoding with respect to the encoded foreground audio signal, a first bit allocation for the encoded foreground audio signal; determining, based on the first bit allocation for the encoded foreground audio signal, a second bit allocation for the quantized spatial component; dequantizing, based on the second bit allocation for the quantized spatial component, the quantized spatial component to obtain a spatial component; and reconstructing, based on the foreground audio signal and the spatial component, the scene-based audio data.

In another example, various aspects of the techniques are directed to a device configured to decode a bitstream representative of encoded scene-based audio data, the device comprising: means for obtaining, from the bitstream, an encoded foreground audio signal and a corresponding quantized spatial component that defines the spatial characteristics of the encoded foreground audio signal; means for performing psychoacoustic audio decoding with respect to the encoded foreground audio signal to obtain a foreground audio signal; means for determining, when performing psychoacoustic audio decoding with respect to the encoded foreground audio signal, a first bit allocation for the encoded foreground audio signal; means for determining, based on the first bit allocation for the encoded foreground audio signal, a second bit allocation for the quantized spatial component; means for dequantizing, based on the second bit allocation for the quantized spatial component, the quantized spatial component to obtain a spatial component; and means for reconstructing, based on the foreground audio signal and the spatial component, the scene-based audio data.

In another example, various aspects of the techniques are directed to a non-transitory computer-readable storage medium having stored thereon instructions that, when executed, cause one or more processors to: obtain, from a bitstream representative of scene-based audio data, an encoded foreground audio signal and a corresponding quantized spatial component that defines the spatial characteristics of the encoded foreground audio signal; perform psychoacoustic audio decoding with respect to the encoded foreground audio signal to obtain a foreground audio signal; determine, when performing psychoacoustic audio decoding with respect to the encoded foreground audio signal, a first bit allocation for the encoded foreground audio signal; determine, based on the first bit allocation for the encoded foreground audio signal, a second bit allocation for the quantized spatial component; dequantize, based on the second bit allocation for the quantized spatial component, the quantized spatial component to obtain a spatial component; and reconstruct, based on the foreground audio signal and the spatial component, the scene-based audio data.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
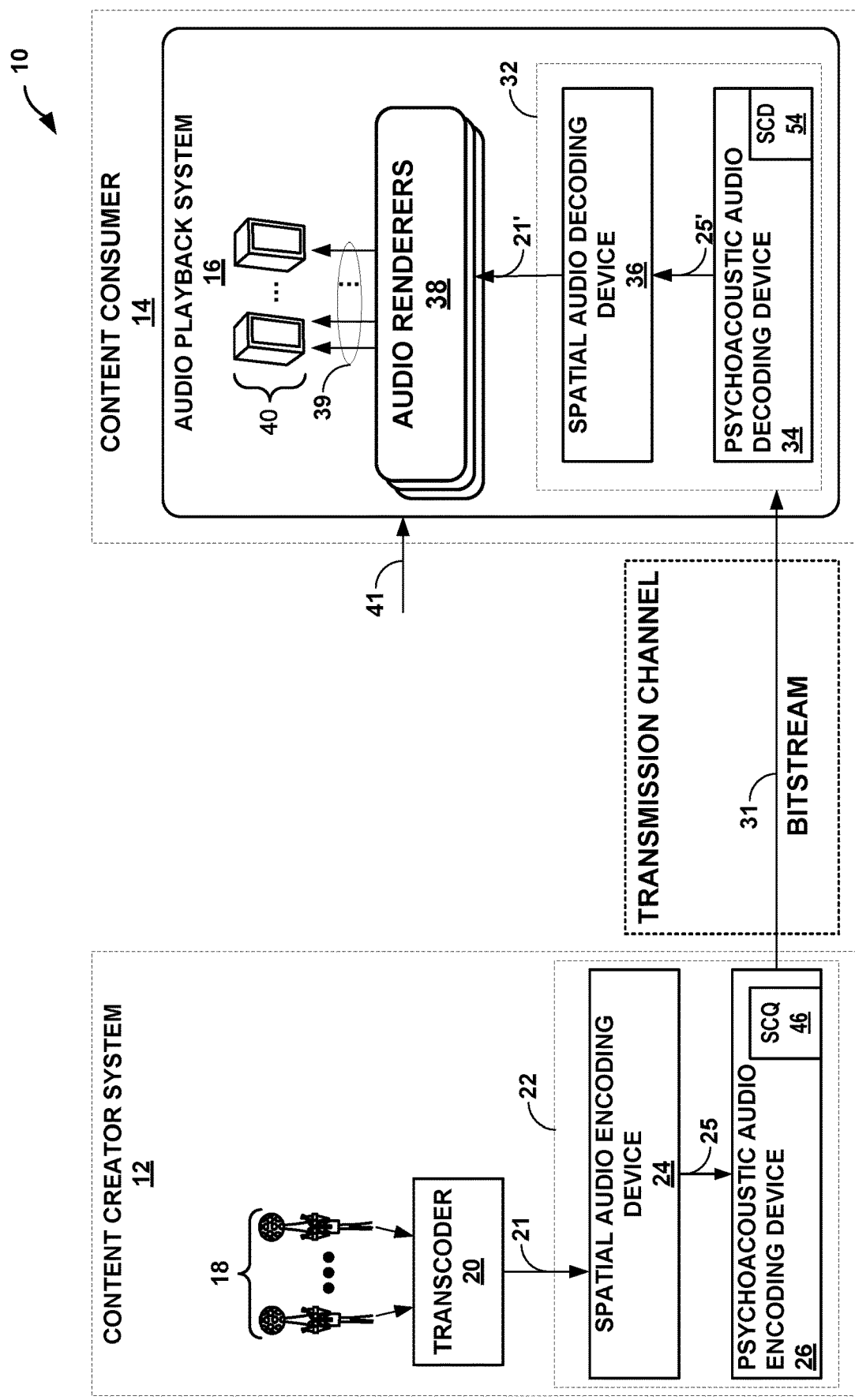
FIG. 1 is a diagram illustrating a system that may perform various aspects of the techniques described in this disclosure.

Different types of audio formats exist including channel-based, object-based, and scene-based. Scene-based formats may use ambisonic technology. ambisonic technology allows for soundfields to be represented using a hierarchical set of elements that can be rendered to speaker feeds for most speaker configurations.

One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions (e.g., pulse code modulated—PCM—audio objects, which include the audio object and metadata defining a location of the audio object within a soundfield) of the soundfield. The SHC (which also may be referred to as ambisonic coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the soundfield corresponding to an individual audio object may be expressed as:

$$A_n^m(k)=g(\omega)(-4\pi ik)h_n^{(2)}(kr_s)Y_n^{m*}(\theta_s,\varphi_s),$$

where i is, $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the PCM stream) allows us to convert each PCM object and the corresponding location into the SHC $A_n^m(k)$. Further, it can be shown (since the above is a linear and orthogonal decomposition) that the $A_n^m(k)$ coefficients for each object are additive. In this manner, a number of PCM objects (where a PCM object is one example of the audio objects) can be represented by the $A_n^m(k)$ coefficients (e.g., as a sum of the coefficient vectors for the individual objects). Essentially, the coefficients contain information about the soundfield (the pressure as a function of 3D coordinates), and the above represents the transformation from individual objects to a representation of the overall soundfield, in the vicinity of the observation point $\{r_r,\theta_r,\varphi_r\}$. The following figures are described below in the context of SHC-based audio coding.

FIG. 1 is a diagram illustrating a system 10 that may perform various aspects of the techniques described in this disclosure. As shown in the example of FIG. 1, the system 10 includes a content creator system 12 and a content consumer 14. While described in the context of the content creator system 12 and the content consumer 14, the techniques may be implemented in any context in which SHCs (which may also be referred to as ambisonic coefficients) or any other hierarchical representation of a soundfield are encoded to form a bitstream representative of the audio data.

Moreover, the content creator system 12 may represent a system comprising one or more of any form of computing devices capable of implementing the techniques described in this disclosure, including a handset (or cellular phone, including a so-called "smartphone," or, in other words, mobile phone or handset), a tablet computer, a laptop computer, a desktop computer, an extended reality (XR) device (which may refer to any one or more of virtual reality—VR—devices, augmented reality—AR—devices, mixed reality—MR—devices, etc.), a gaming system, an optical disc player, a receiver (such as an audio/visual—A/V—receiver), or dedicated hardware to provide a few examples.

Likewise, the content consumer 14 may represent any form of computing device capable of implementing the techniques described in this disclosure, including a handset (or cellular phone, including a so-called "smartphone," or in other words, a mobile handset or phone), an XR device, a tablet computer, a television (including so-called "smart televisions"), a set-top box, a laptop computer, a gaming system or console, a watch (including a so-called smart watch), wireless headphones (including so-called "smart headphones"), or a desktop computer to provide a few examples.

The content creator system 12 may represent any entity that may generate audio content and possibly video content for consumption by content consumers, such as the content consumer 14. The content creator system 12 may capture live audio data at events, such as sporting events, while also inserting various other types of additional audio data, such as commentary audio data, commercial audio data, intro or exit audio data and the like, into the live audio content.

The content consumer 14 represents an individual that owns or has access to an audio playback system 16, which may refer to any form of audio playback system capable of rendering higher order ambisonic audio data (which includes higher order audio coefficients that, again, may also be referred to as spherical harmonic coefficients) to speaker feeds for play back as audio content. In the example of FIG. 1, the content consumer 14 includes the audio playback system 16.

The ambisonic audio data may be defined in the spherical harmonic domain and rendered or otherwise transformed from the spherical harmonic domain to a spatial domain, resulting in the audio content in the form of one or more speaker feeds. The ambisonic audio data may represent one example of "scene-based audio data," which describes an audio scene using ambisonic coefficients. Scene-based audio data is distinguished from object-based audio data in that an entire scene is described (in the spherical harmonic domain) as opposed to discreet objects (in the spatial domain) as is common in object-based audio data. Scene-based audio data is different than channel-based audio data in that the scene-based audio data resides in the spherical harmonic domain as opposed to the spatial domain of channel-based audio data.

In any event, the content creator system 12 includes microphones 18 that record or otherwise obtain live recordings in various formats (including directly as ambisonic coefficients and audio objects). When the microphone array 18 (which may also be referred to as "microphones 18") obtains live audio directly as ambisonic coefficients, the microphones 18 may include a transcoder, such as an ambisonic transcoder 20 shown in the example of FIG. 1.

In other words, although shown as separate from the microphones 5, a separate instance of the ambisonic Transcoder 20 may be included within each of the microphones 5 so as to transcode the captured feeds into the ambisonic coefficients 21. However, when not included within the microphones 18, the ambisonic Transcoder 20 may transcode the live feeds output from the microphones 18 into the ambisonic coefficients 21. In this respect, the ambisonic Transcoder 20 may represent a unit configured to transcode microphone feeds and/or audio objects into the ambisonic coefficients 21. The content creator system 12 therefore includes the ambisonic transcoder 20 as integrated with the microphones 18, as a transcoder separate from the microphones 18 or some combination thereof.

The content creator system 12 may also include an audio encoder 22 configured to compress the ambisonic coefficients 21 to obtain a bitstream 31. The audio encoder 22 may include a spatial audio encoding device 24 and a psychoacoustic audio encoding device 26. The spatial audio encoding device 24 may represent a device capable of performing the compression with respect to the ambisonic coefficients 21 to obtain intermediately formatted audio data 25 (which may also be referred to as "mezzanine formatted audio data 25" when the content creator system 12 represents a broadcast network as described in more detail below). Intermediately formatted audio data 25 may represent audio data that is compressed using spatial audio compression but that has not yet undergone psychoacoustic audio encoding (e.g., such as AptX or advanced audio coding—AAC, or other similar types of psychoacoustic audio encoding, including various enhanced AAC—eAAC—such as high efficiency AAC—HE-AAC—HE-AAC v2, which is also known as eAAC+, etc.).

The spatial audio encoding device 24 may be configured to compress the ambisonic coefficients 21. That is, the spatial audio encoding device 24 may compress the ambisonic coefficients 21 using a decomposition involving application of a linear invertible transform (LIT). One example of the linear invertible transform is referred to as a "singular value decomposition" ("SVD"), a principal component analysis ("PCA"), or an Eigenvalue decomposition, which may represent different examples of a linear invertible decomposition.

In this example, the spatial audio encoding device 24 may apply SVD to the ambisonic coefficients 21 to determine a decomposed version of the ambisonic coefficients 21. The decomposed version of the ambisonic coefficients 21 may include one or more of predominant audio signals and one or more corresponding spatial components describing spatial characteristics, e.g., a direction, shape, and width, of the associated predominant audio signals. As such, the spatial audio encoding device 24 may apply the decomposition to the ambisonic coefficients 21 to decouple energy (as represented by the predominant audio signals) from the spatial characteristics (as represented by the spatial components).

The spatial audio encoding device 24 may analyze the decomposed version of the ambisonic coefficients 21 to identify various parameters, which may facilitate reordering of the decomposed version of the ambisonic coefficients 21. The spatial audio encoding device 24 may reorder the decomposed version of the ambisonic coefficients 21 based on the identified parameters, where such reordering may improve coding efficiency given that the transformation may reorder the ambisonic coefficients across frames of the ambisonic coefficients (where a frame commonly includes M samples of the decomposed version of the ambisonic coefficients 21 and M is, in some examples, set to 1024).

After reordering the decomposed version of the ambisonic coefficients 21, the spatial audio encoding device 24 may select one or more of the decomposed versions of the ambisonic coefficients 21 as representative of foreground (or, in other words, distinct, predominant or salient) components of the soundfield. The spatial audio encoding device 24 may specify the decomposed version of the ambisonic coefficients 21 representative of the foreground components (which may also be referred to as a "predominant sound signal," a "predominant audio signal," or a "predominant sound component") and associated directional information (which may also be referred to as a "spatial component" or, in some instances, as a so-called "V-vector" that identifies spatial characteristics of the corresponding audio object).

The spatial component may represent a vector with multiple different elements (which in terms of a vector may be referred to as "coefficients") and thereby may be referred to as a "multidimensional vector."

The spatial audio encoding device 24 may next perform a soundfield analysis with respect to the ambisonic coefficients 21 in order to, at least in part, identify the ambisonic coefficients 21 representative of one or more background (or, in other words, ambient) components of the soundfield. The background components may also be referred to as a "background audio signal" or an "ambient audio signal." The spatial audio encoding device 24 may perform energy compensation with respect to the background audio signal given that, in some examples, the background audio signal may only include a subset of any given sample of the ambisonic coefficients 21 (e.g., such as those corresponding to zero and first order spherical basis functions and not those corresponding to second or higher order spherical basis functions). When order-reduction is performed, in other words, the spatial audio encoding device 24 may augment (e.g., add/subtract energy to/from) the remaining background ambisonic coefficients of the ambisonic coefficients 21 to compensate for the change in overall energy that results from performing the order reduction.

The spatial audio encoding device 24 may next perform a form of interpolation with respect to the foreground directional information (which is another way of referring to the spatial components) and then perform an order reduction with respect to the interpolated foreground directional information to generate order reduced foreground directional information. The spatial audio encoding device 24 may further perform, in some examples, a quantization with respect to the order reduced foreground directional information, outputting coded foreground directional information. In some instances, this quantization may comprise a scalar/entropy quantization possibly in the form of vector quantization. The spatial audio encoding device 24 may then output the intermediately formatted audio data 25 as the background audio signals, the foreground audio signals, and the quantized foreground directional information.

In any event, the background audio signals and the foreground audio signals may comprise transport channels in some examples. That is, the spatial audio encoding device 24 may output a transport channel for each frame of the ambisonic coefficients 21 that includes a respective one of the background audio signals (e.g., M samples of one of the ambisonic coefficients 21 corresponding to the zero or first order spherical basis function) and for each frame of the foreground audio signals (e.g., M samples of the audio objects decomposed from the ambisonic coefficients 21). The spatial audio encoding device 24 may further output side information (which may also be referred to as "sideband information") that includes the quantized spatial components corresponding to each of the foreground audio signals.

Collectively, the transport channels and the side information may be represented in the example of FIG. 1 as ambisonic transport format (ATF) audio data 25 (which is another way to refer to the intermediately formatted audio data). In other words, the AFT audio data 25 may include the transport channels and the side information (which may also be referred to as "metadata"). The ATF audio data 25 may conform to, as one example, an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018-06). As such, the ATF audio data 25 may be referred to as HTF audio data 25.

The spatial audio encoding device 24 may then transmit or otherwise output the ATF audio data 25 to psychoacoustic audio encoding device 26. The psychoacoustic audio encoding device 26 may perform psychoacoustic audio encoding with respect to the ATF audio data 25 to generate a bitstream 31. The psychoacoustic audio encoding device 26 may operate according to standardized, open-source, or proprietary audio coding processes. For example, the psychoacoustic audio encoding device 26 may perform psychoacoustic audio encoding according to AptX™, various other versions of AptX (e.g., enhanced AptX—E-AptX, AptX live, AptX stereo, and AptX high definition—AptX-HD), or advanced audio coding (AAC) and derivations thereof. The content creator system 12 may then transmit the bitstream 31 via a transmission channel to the content consumer 14.

In some examples, the psychoacoustic audio encoding device 26 may represent one or more instances of a psychoacoustic audio coder, each of which is used to encode a transport channel of the ATF audio data 25. In some instances, this psychoacoustic audio encoding device 26 may represent one or more instances of an AptX encoding unit (as noted above). The psychoacoustic audio coder unit 26 may, in some instances, invoke an instance of an AptX encoding unit for each transport channel of the ATF audio data 25.

In some examples, to generate the different representations of the soundfield using ambisonic coefficients (which again is one example of the audio data 21), the audio encoder 22 may use a coding scheme for ambisonic representations of a soundfield, referred to as Mixed Order ambisonics (MOA) as discussed in more detail in U.S. application Ser. No. 15/672,058, entitled "MIXED-ORDER ambisonicS (MOA) AUDIO DATA FO COMPUTER-MEDIATED REALITY SYSTEMS," and filed Aug. 8, 2017, published as U.S. patent publication no. 2019/0007781 on Jan. 3, 2019.

To generate a particular MOA representation of the soundfield, the audio encoder 22 may generate a partial subset of the full set of ambisonic coefficients. For instance, each MOA representation generated by the audio encoder 22 may provide precision with respect to some areas of the soundfield, but less precision in other areas. In one example, an MOA representation of the soundfield may include eight (8) uncompressed ambisonic coefficients of the ambisonic coefficients, while the third order ambisonic representation of the same soundfield may include sixteen (16) uncompressed ambisonic coefficients of the ambisonic coefficients. As such, each MOA representation of the soundfield that is generated as a partial subset of the ambisonic coefficients may be less storage-intensive and less bandwidth intensive (if and when transmitted as part of the bitstream 31 over the illustrated transmission channel) than the corresponding third order ambisonic representation of the same soundfield generated from the ambisonic coefficients.

Although described with respect to MOA representations, the techniques of this disclosure may also be performed with respect to full-order ambisonic (FOA) representations in which all of the ambisonic coefficients for a given order N are used to represent the soundfield. In other words, rather than represent the soundfield using a partial, non-zero subset of the ambisonic coefficients, the soundfield representation generator 302 may represent the soundfield using all of the ambisonic coefficients for a given order N, resulting in a total of ambisonic coefficients equaling $(N+1)^2$.

In this respect, the higher order ambisonic audio data (which is another way to refer to ambisonic coefficients in either MOA representations or FOA representations) may include higher order ambisonic coefficients associated with spherical basis functions having an order of one or less (which may be referred to as "$1^{st}$ order ambisonic audio data"), higher order ambisonic coefficients associated with spherical basis functions having a mixed order and suborder (which may be referred to as the "MOA representation" discussed above), or higher order ambisonic coefficients associated with spherical basis functions having an order greater than one (which is referred to above as the "FOA representation").

Moreover, while shown in FIG. 1 as being directly transmitted to the content consumer 14, the content creator system 12 may output the bitstream 31 to an intermediate device positioned between the content creator system 12 and the content consumer 14. The intermediate device may store the bitstream 31 for later delivery to the content consumer 14, which may request this bitstream. The intermediate device may comprise a file server, a web server, a desktop computer, a laptop computer, a tablet computer, a mobile phone, a smart phone, or any other device capable of storing the bitstream 31 for later retrieval by an audio decoder. The intermediate device may reside in a content delivery network capable of streaming the bitstream 31 (and possibly in conjunction with transmitting a corresponding video data bitstream) to subscribers, such as the content consumer 14, requesting the bitstream 31.

Alternatively, the content creator system 12 may store the bitstream 31 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to those channels by which content stored to these mediums are transmitted (and may include retail stores and other store-based delivery mechanism). In any event, the techniques of this disclosure should not therefore be limited in this respect to the example of FIG. 1.

As further shown in the example of FIG. 1, the content consumer 14 includes the audio playback system 16. The audio playback system 16 may represent any audio playback system capable of playing back multi-channel audio data. The audio playback system 16 may further include an audio decoding device 32. The audio decoding device 32 may represent a device configured to decode ambisonic coefficients 11' from the bitstream 31, where the ambisonic coefficients 11' may be similar to the ambisonic coefficients 11 but differ due to lossy operations (e.g., quantization) and/or transmission via the transmission channel.

The audio decoding device 32 may include a psychoacoustic audio decoding device 34 and a spatial audio decoding device 36. The psychoacoustic audio decoding device 34 may represent a unit configured to operate reciprocally to the psychoacoustic audio encoding device 26 to reconstruct the ATF audio data 25' from the bitstream 31. Again, the prime notation with respect to the ATF audio data 25 output from the psychoacoustic audio decoding device 34 denotes that the ATF audio data 25' may differ slightly from the ATF audio data 25 due to lossy or other operations performed during compression of the ATF audio data 25. The psychoacoustic audio decoding device 34 may be configured to perform decompression in accordance with standardized, open-source, or proprietary audio coding processing (such as the above noted AptX, the variations of AptX, AAC, the variations of AAC, etc.).

While described primarily below with respect to AptX, the techniques may be applied with respect to other psychoacoustic audio codecs. Examples of other psychoacoustic audio codecs include Audio Codec 3 (AC-3), Apple Lossless Audio Codec (ALAC), MPEG-4 Audio Lossless Streaming (ALS), aptX®, enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA).

In any event, the psychoacoustic audio decoding device 34 may perform psychoacoustic decoding with respect to the foreground audio objects specified in the bitstream 31 and the encoded ambisonic coefficients representative of background audio signals specified in the bitstream 31. In this manner, the psychoacoustic audio decoding device 34 may obtain the ATF audio data 25' and output the ATF audio data 25' to the spatial audio decoding device 36.

The spatial audio decoding device 36 may represent a unit configured to operate reciprocally to the spatial audio encoding device 24. That is, the spatial audio decoding device 36 may dequantize the foreground directional information specified in the bitstream 31. The spatial audio decoding device 36 may further perform dequantization with respect to the quantized foreground directional information to obtain decoded foreground directional information. The spatial audio decoding device 36 may next perform interpolation with respect to the decoded foreground directional information and then determine the ambisonic coefficients representative of the foreground components based on the decoded foreground audio signals and the interpolated foreground directional information. The spatial audio decoding device 36 may then determine the ambisonic coefficients 11' based on the determined ambisonic coefficients representative of the foreground audio signals and the decoded ambisonic coefficients representative of the background audio signals.

The audio playback system 16 may, after decoding the bitstream 31 to obtain the ambisonic coefficients 11', render the ambisonic coefficients 11' to output speaker feeds 39. The audio playback system 16 may include a number of different audio renderers 38. The audio renderers 38 may each provide for a different form of rendering, where the different forms of rendering may include one or more of the various ways of performing vector-base amplitude panning (VBAP), one or more of the various ways of performing binaural rendering (e.g., head related transfer functions—HRTF, Binaural Room Impulse Response—BRIR, etc.), and/or one or more of the various ways of performing soundfield synthesis.

The audio playback system 16 may output speaker feeds 39 to one or more of speakers 40. The speaker feeds 39 may drive the speakers 40. The speakers 40 may represent loudspeakers (e.g., transducers placed in a cabinet or other housing), headphone speakers, or any other type of transducer capable of emitting sounds based on electrical signals.

To select the appropriate renderer or, in some instances, generate an appropriate renderer, the audio playback system 16 may obtain loudspeaker information 41 indicative of a number of the speakers 40 and/or a spatial geometry of the speakers 40. In some instances, the audio playback system 16 may obtain the loudspeaker information 41 using a reference microphone and driving the speakers 40 in such a manner as to dynamically determine the speaker information 41. In other instances, or in conjunction with the dynamic determination of the speaker information 41, the audio playback system 16 may prompt a user to interface with the audio playback system 16 and input the speaker information 41.

The audio playback system 16 may select one of the audio renderers 38 based on the speaker information 41. In some instances, the audio playback system 16 may, when none of the audio renderers 38 are within some threshold similarity measure (in terms of the loudspeaker geometry) to that specified in the speaker information 41, generate the one of audio renderers 38 based on the speaker information 41. The audio playback system 16 may, in some instances, generate the one of audio renderers 38 based on the speaker information 41 without first attempting to select an existing one of the audio renderers 38.

While described with respect to speaker feeds 39, the audio playback system 16 may render headphone feeds from either the speaker feeds 39 or directly from the ambisonic coefficients 11', outputting the headphone feeds to headphone speakers. The headphone feeds may represent binaural audio speaker feeds, which the audio playback system 16 renders using a binaural audio renderer.

As described above, the audio encoder 22 may invoke spatial audio encoding device 24 to perform spatial audio encoding (or otherwise compress) the ambisonics audio data 21 and thereby obtain the ATF audio data 25. During application of spatial audio encoding to the ambisonics audio data 21, the spatial audio encoding device 24 may obtain a foreground audio signal and a corresponding spatial component, which are specified in encoded form respectively as a transport channel and accompanying metadata (or sideband information).

The spatial audio encoding device 24 may, as noted above, apply vector quantization with respect to the spatial component and prior to specifying the spatial component as metadata in the AFT audio data 25. The psychoacoustic audio encoding device 26 may quantize each of the transport channels of the ATF audio data 25 independently from the quantization of the spatial component performed by the spatial audio encoding device 24. As the spatial component provides spatial characteristics for the corresponding foreground audio signal, the independent quantization may result in different error between the spatial component and the foreground audio signal, which may result in audio artifacts when played back, such as incorrect localization of the foregoing audio signal within the reconstructed soundfield, poor spatial resolution for a higher quality foreground audio signal, and other anomalies that may result in distractions or noticeable inaccuracies during reproduction of the soundfield.

In accordance with various aspects of the techniques described in this disclosure, the spatial audio encoding device 24 and the psychoacoustic audio encoding device 26 are integrated in that the psychoacoustic audio encoding device 26 may incorporate a spatial component quantizer (SCQ) 46, offloading quantization from the spatial audio encoding device 24. The SCQ 46 may perform quantization with respect to the spatial component based on bit allocations specified for the transport channels, thereby more tightly integrating the spatial audio encoding device 24 and the psychoacoustic audio encoding device 26. Aligning or otherwise integrating the two devices 24 and 26 may allow for more uniform quantization that may reduce or otherwise eliminate the above noted audio artifacts, thereby improving performance of the audio encoder 22 itself.

In operation, the spatial audio encoding device 24 may perform spatial audio encoding with respect to the scene-based audio data 21 to obtain the foreground audio signal and the corresponding spatial component. However, the spatial audio encoding performed by the spatial audio encoding device 24 omits the above noted quantization of the spatial component, as again quantization has been offloaded to the psychoacoustic audio encoding device 26. The spatial audio encoding device 24 may output the ATF audio data 25 to the psychoacoustic audio encoding device 26.

The audio encoder 22 invokes the psychoacoustic audio encoding device 26 to perform psychoacoustic audio encoding with respect to the foreground audio signal to obtain an encoded foreground audio signal. In some examples, the psychoacoustic audio encoding device 26 may perform the psychoacoustic audio encoding according to an AptX compression algorithm, including any of the various versions of AptX listed above. The AptX compression algorithm is generally described with respect to the examples of FIGS. 5-8.

The psychoacoustic audio encoding device 26 may determine, when performing psychoacoustic audio encoding with respect to the foreground audio signal, a first bit allocation for the foreground audio signal. The psychoacoustic audio encoding device 26 may determine, based on the first bit allocation for the foreground audio signal, a second bit allocation for the spatial component. As the second bit allocation is determined based on the first bit allocation, the psychoacoustic audio encoding device 26 more fully integrates quantization across the foreground audio signal and the spatial component. The psychoacoustic audio encoding device 26 may invoke the SCQ 46, passing the second bit allocation to the SCQ 46. The SCQ 46 may apply quantization (such as vector quantization) to achieve the bit allocation for the spatial component that meets or exceeds the second bit allocation. The psychoacoustic audio encoding device 26 may then specify, in the bitstream 31, the encoded foreground audio signal and the quantized spatial component.

The audio decoder 32 may, as noted above, operate reciprocally to the audio encoder 22. As such, the audio decoder 32 may obtain the bitstream 31 and invoke the psychoacoustic audio decoding device 34 to perform psychoacoustic audio decoding with respect to the encoded foreground audio signal to obtain the foreground audio signal. As noted above, the psychoacoustic audio decoding device 34 may perform the psychoacoustic audio decoding in accordance with an AptX decompression algorithm. Again, more information regarding the AptX decompression algorithm is described below with respect to the examples of FIGS. 5-8.

In any event, when performing the psychoacoustic audio encoding with respect to the foreground audio signal, the psychoacoustic audio decoding device 34 may determine a first bit allocation for the encoded foreground audio signal. The psychoacoustic audio decoding device 34 may also determine, based on the first bit allocation for the encoded foreground audio signal, a second bit allocation for the quantized spatial component. The psychoacoustic audio decoding device 34 may invoke the spatial component dequantizer (SCD) 54, which may dequantize, based on the second bit allocation for the spatial component, the quantized spatial component to obtain the spatial component. The psychoacoustic audio decoding device 34 may reconstruct, based on the foreground audio signal and the spatial component, the ATF audio data 25'. The spatial audio decoding device 36 may then reconstruct, based on the foreground audio signal and the spatial component, the scene-based audio data 21'.

Figure 2:
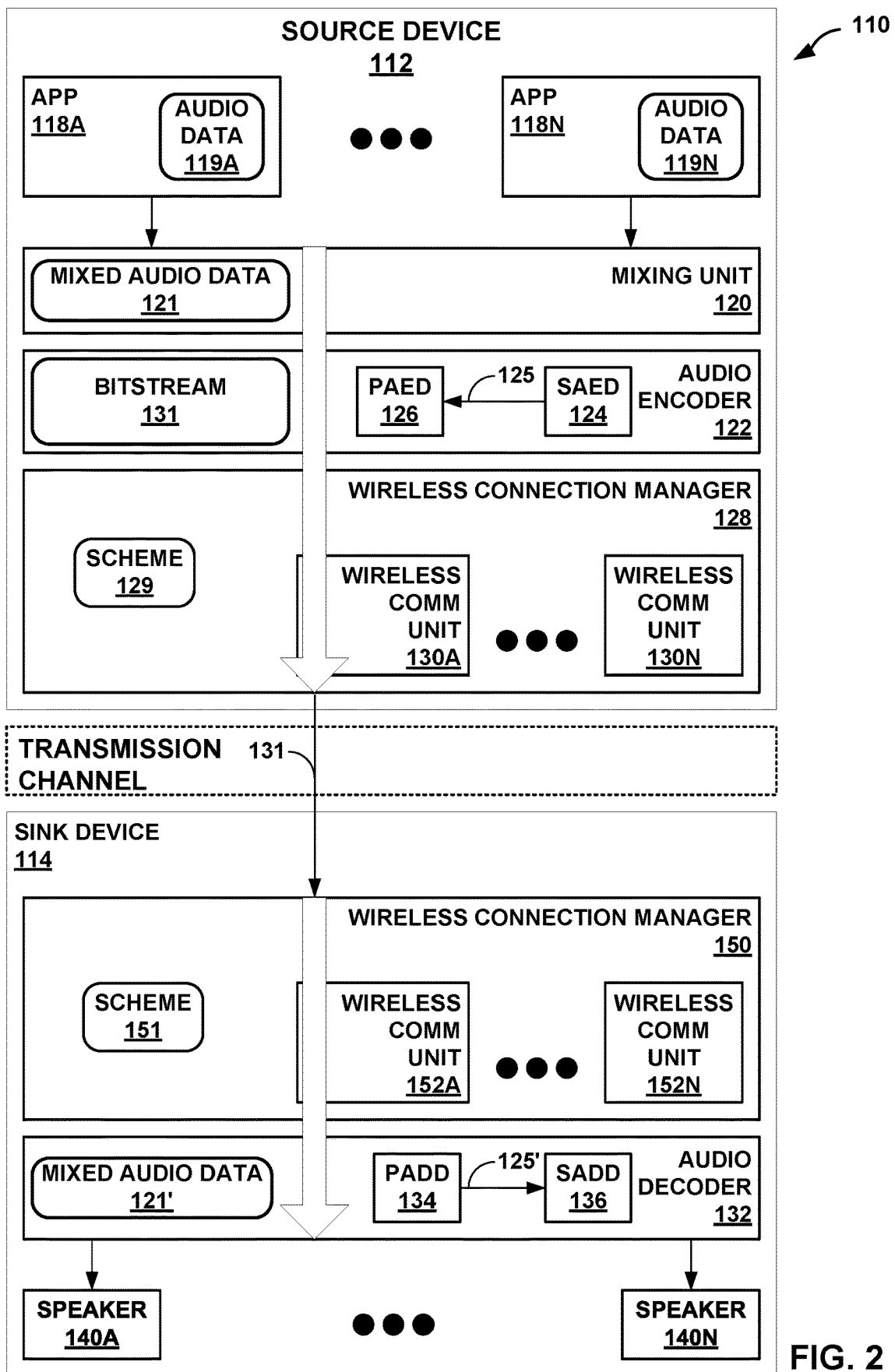
FIG. 2 is a diagram illustrating another example of a system that may perform various aspects of the techniques described in this disclosure.

FIG. 2 is a diagram illustrating another example of a system that may perform various aspects of the techniques described in this disclosure. The system 110 of FIG. 2 may represent one example of the system 10 shown in the example of FIG. 1. As shown in the example of FIG. 2, the system 110 includes a source device 112 and a sink device 114, where the source device 112 may represent an example of the content creator system 12 and the sink device 114 may represent an example of the content consumer 14 and/or the audio playback system 16.

Although described with respect to the source device 112 and the sink device 114, the source device 112 may operate, in some instances, as the sink device, and the sink device 114 may, in these and other instances, operate as the source device. As such, the example of system 110 shown in FIG. 2 is merely one example illustrative of various aspects of the techniques described in this disclosure.

In any event, the source device 112 may, as noted above, represent any form of computing device capable of implementing the techniques described in this disclosure, including a handset (or cellular phone, including a so-called "smartphone"), a tablet computer, a so-called smart phone, a remotely piloted aircraft (such as a so-called "drone"), a robot, a desktop computer, a receiver (such as an audio/visual—AV—receiver), a set-top box, a television (including so-called "smart televisions"), a media player (such as a digital video disc player, a streaming media player, a Blue-Ray Disc™ player, etc.), or any other device capable of communicating audio data wirelessly to a sink device via a personal area network (PAN). For purposes of illustration, the source device 112 is assumed to represent a smartphone.

The sink device 114 may represent any form of computing device capable of implementing the techniques described in this disclosure, including a handset (or, in other words, a cellular phone, a mobile phone, a mobile handset, etc.), a tablet computer, a smartphone, a desktop computer, a wireless headset (which may include wireless headphones that include or exclude a microphone, and so-called smart wireless headphones that include additional functionality such as fitness monitoring, on-board music storage and/or playback, dedicated cellular capabilities, etc.), a wireless speaker (including a so-called "smart speaker"), a watch (including so-called "smart watches"), or any other device capable of reproducing a soundfield based on audio data communicated wirelessly via the PAN. Also, for purposes of illustration, the sink device 114 is assumed to represent wireless headphones.

As shown in the example of FIG. 2, the source device 112 includes one or more applications ("apps") 118A-118N ("apps 118"), a mixing unit 120, an audio encoder 122 (which includes a spatial audio encoding device—SAED—124 and a psychoacoustic audio encoding device—PAED—126), and a wireless connection manager 128. Although not shown in the example of FIG. 2, the source device 112 may include a number of other elements that support operation of apps 118, including an operating system, various hardware and/or software interfaces (such as user interfaces, including graphical user interfaces), one or more processors, memory, storage devices, and the like.

Each of the apps 118 represent software (such as a collection of instructions stored to a non-transitory computer readable media) that configure the system 110 to provide some functionality when executed by the one or more processors of the source device 112. The apps 118 may, to list a few examples, provide messaging functionality (such as access to emails, text messaging, and/or video messaging), voice calling functionality, video conferencing functionality, calendar functionality, audio streaming functionality, direction functionality, mapping functionality, gaming functionality. Apps 118 may be first party applications designed and developed by the same company that designs and sells the operating system executed by the source device 112 (and often pre-installed on the source device 112) or third-party applications accessible via a so-called "app store" or possibly pre-installed on the source device 112. Each of the apps 118, when executed, may output audio data 119A-119N ("audio data 119"), respectively.

In some examples, the audio data 119 may be generated from a microphone (not pictured, but similar to microphones 5 shown in the example of FIG. 1) connected to the source device 112. The audio data 119 may include ambisonic coefficients similar to ambisonic audio data 21 discussed above with respect to the example of FIG. 1, where such ambisonic audio data may be referred to as "scene-based audio data." As such, the audio data 119 may also be referred to as "scene-based audio data 119" or "ambisonic audio data 119."

Although described with respect to ambisonic audio data, the techniques may be performed with respect to ambisonic audio data that does not necessarily include coefficients corresponding to so-called "higher order" spherical basis functions (e.g., spherical basis functions having an order greater than one). Accordingly, the techniques may be performed with respect to ambisonic audio data that includes coefficients corresponding to only a zero-order spherical basis function, or only a zero and first order spherical basis functions.

The mixing unit 120 represents a unit configured to mix one or more of audio data 119 output by the apps 118 (and other audio data output by the operating system—such as alerts or other tones, including keyboard press tones, ringtones, etc.) to generate mixed audio data 121. Audio mixing may refer to a process whereby multiple sounds (as set forth in the audio data 119) are combined into one or more channels. During mixing, the mixing unit 120 may also manipulate and/or enhance volume levels (which may also be referred to as "gain levels"), frequency content, and/or panoramic position of the ambisonic audio data 119. In the context of streaming the ambisonic audio data 119 over a wireless PAN session, the mixing unit 120 may output the mixed audio data 121 to the audio encoder 122.

The audio encoder 122 may be similar, if not substantially similar, to the audio encoder 22 described above in the example of FIG. 1. That is, the audio encoder 122 may represent a unit configured to encode the mixed audio data 121 and thereby obtain encoded audio data in the form of a bitstream 131. In some examples, the audio encoder 122 may encode individual ones of the audio data 119.

Referring for purposes of illustration to one example of the PAN protocols, Bluetooth® provides for a number of different types of audio codecs (which is a word resulting from combining the words "encoding" and "decoding") and is extensible to include vendor specific audio codecs. The Advanced Audio Distribution Profile (A2DP) of Bluetooth® indicates that support for A2DP requires supporting a sub-band codec specified in A2DP. A2DP also supports codecs set forth in MPEG-1 Part 3 (MP2), MPEG-2 Part 3 (MP3), MPEG-2 Part 7 (advanced audio coding—AAC), MPEG-4 Part 3 (high efficiency-AAC—HE-AAC), and Adaptive Transform Acoustic Coding (ATRAC). Furthermore, as noted above, A2DP of Bluetooth® supports vendor specific codecs, such as aptX™ and various other versions of aptX (e.g., enhanced aptX—E-aptX, aptX live, and aptX high definition—aptX-HD).

The audio encoder 122 may operate consistent with one or more of any of the above listed audio codecs, as well as, audio codecs not listed above, but that operate to encode the mixed audio data 121 to obtain the encoded audio data 131 (which is another way to refer to the bitstream 131). The audio encoder 122 may first invoke the SAED 124, which may be similar if not substantially similar to SAED 24 shown in the example of FIG. 1. The SAED 124 may perform the above noted spatial audio compression with respect to the mixed audio data to obtain ATF audio data 125 (which may be similar if not substantially similar to the ATF audio data 25 shown in the example of FIG. 1). The SAED 124 may output the ATF audio data 25 to the PAED 126.

The PAED 126 may be similar if not substantially similar to the PAED 26 shown in the example of FIG. 1. The PAED 126 may perform psychoacoustic audio encoding according to any of the foregoing codecs (including AptX and variations thereof) to obtain the bitstream 131. The audio encoder 122 may output the encoded audio data 131 to one of the wireless communication units 130 (e.g., the wireless communication unit 130A) managed by the wireless connection manager 128.

The wireless connection manager 128 may represent a unit configured to allocate bandwidth within certain frequencies of the available spectrum to the different ones of the wireless communication units 130. For example, the Bluetooth® communication protocols operate over within the 2.5 GHz range of the spectrum, which overlaps with the range of the spectrum used by various WLAN communication protocols. The wireless connection manager 128 may allocate some portion of the bandwidth during a given time to the Bluetooth® protocol and different portions of the bandwidth during a different time to the overlapping WLAN protocols. The allocation of bandwidth and other is defined by a scheme 129. The wireless connection manager 128 may expose various application programmer interfaces (APIs) by which to adjust the allocation of bandwidth and other aspects of the communication protocols so as to achieve a specified quality of service (QoS). That is, the wireless connection manager 128 may provide the API to adjust the scheme 129 by which to control operation of the wireless communication units 130 to achieve the specified QoS.

In other words, the wireless connection manager 128 may manage coexistence of multiple wireless communication units 130 that operate within the same spectrum, such as certain WLAN communication protocols and some PAN protocols as discussed above. The wireless connection manager 128 may include a coexistence scheme 129 (shown in FIG. 2 as "scheme 129") that indicates when (e.g., an interval) and how many packets each of the wireless communication units 130 may send, the size of the packets sent, and the like.

The wireless communication units 130 may each represent a wireless communication unit 130 that operates in accordance with one or more communication protocols to communicate the bitstream 131 via a transmission channel to the sink device 114. In the example of FIG. 2, the wireless communication unit 130A is assumed for purposes of illustration to operate in accordance with the Bluetooth® suite of communication protocols. It is further assumed that the wireless communication unit 130A operates in accordance with A2DP to establish a PAN link (over the transmission channel) to allow for delivery of the bitstream 131 from the source device 112 to the sink device 114.

More information concerning the Bluetooth® suite of communication protocols can be found in a document entitled "Bluetooth Core Specification v 5.0," published Dec. 6, 2016, and available at: www.bluetooth.org/en-us/specification/adopted-specifications. More information concerning A2DP can be found in a document entitled "Advanced Audio Distribution Profile Specification," version 1.3.1, published on Jul. 14, 2015.

The wireless communication unit 130A may output the bitstream 131 to the sink device 114 via a transmission channel, which is assumed to be a wireless channel in the example of Bluetooth. While shown in FIG. 2 as being directly transmitted to the sink device 114, the source device 112 may output the bitstream 131 to an intermediate device positioned between the source device 112 and the sink device 114. The intermediate device may store the bitstream 131 for later delivery to the sink device 14, which may request the bitstream 131. The intermediate device may comprise a file server, a web server, a desktop computer, a laptop computer, a tablet computer, a mobile phone, a smart phone, or any other device capable of storing the bitstream 131 for later retrieval by an audio decoder. This intermediate device may reside in a content delivery network capable of streaming the bitstream 131 (and possibly in conjunction with transmitting a corresponding video data bitstream) to subscribers, such as the sink device 114, requesting the bitstream 131.

Alternatively, the source device 112 may store the bitstream 131 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to those channels by which content stored to these mediums are transmitted (and may include retail stores and other store-based delivery mechanism). In any event, the techniques of this disclosure should not therefore be limited in this respect to the example of FIG. 2.

As further shown in the example of FIG. 2, the sink device 114 includes a wireless connection manager 150 that manages one or more of wireless communication units 152A-152N ("wireless communication units 152") according to a scheme 151, an audio decoder 132 (including a psychoacoustic audio decoding device—PADD—134 and a spatial audio decoding device—SADD—136), and one or more speakers 140A-140N ("speakers 140," which may be similar to the speakers 40 shown in the example of FIG. 1). The wireless connection manager 150 may operate in a manner similar to that described above with respect to the wireless connection manager 128, exposing an API to adjust scheme 151 by which operation of the wireless communication units 152 to achieve a specified QoS.

The wireless communication units 152 may be similar in operation to the wireless communication units 130, except that the wireless communication units 152 operate reciprocally to the wireless communication units 130 to receive the bitstream 131 via the transmission channel. One of the wireless communication units 152 (e.g., the wireless communication unit 152A) is assumed to operate in accordance with the Bluetooth® suite of communication protocols and reciprocal to the wireless communication protocol. The wireless communication unit 152A may output the bitstream 131 to the audio decoder 132.

The audio decoder 132 may operate in a manner that is reciprocal to the audio encoder 122. The audio decoder 132 may operate consistent with one or more of any of the above listed audio codecs, as well as, audio codecs not listed above, but that operate to decode the encoded audio data 131 to obtain mixed audio data 121'. Again, the prime designation with respect to "mixed audio data 121" denotes that there may be some loss due to quantization or other lossy operations that occur during encoding by the audio encoder 122.

The audio decoder 132 may invoke the PADD 134 to perform psychoacoustic audio decoding with respect to the bitstream 131 to obtain ATF audio data 125', which the PADD 134 may output to the SADD 136. The SADD 136 may perform spatial audio decoding to obtain the mixed audio data 121'. Although renderers (similar to the renderers 38 of FIG. 1) are not shown in the example of FIG. 2 for ease of illustration purposes, the audio decoder 132 may render the mixed audio data 121' to speaker feeds (using any of the renderers, such as renderers 38 discussed above with respect to the example of FIG. 1) and output the speaker feeds to one or more of the speakers 140.

Each of the speakers 140 represent a transducer configured to reproduce a soundfield from the speaker feeds. The transducer may be integrated within the sink device 114 as shown in the example of FIG. 2 or may be communicatively coupled to the sink device 114 (via a wire or wirelessly). The speakers 140 may represent any form of speaker, such as a loudspeaker, a headphone speaker, or a speaker in an earbud. Furthermore, although described with respect to a transducer, the speakers 140 may represent other forms of speakers, such as the "speakers" used in bone conducting headphones that send vibrations to the upper jaw, which induces sound in the human aural system.

As described above, the PAED 126 may perform various aspects of the quantization techniques described above with respect to the PAED 26 to quantize, based on the foreground audio signal dependent bit allocation for the spatial component, the spatial component. The PADD 134 may also perform various aspects of the quantization techniques described above with respect to the PADD 34 to dequantize, based on the foreground audio signal dependent bit allocation for the spatial component, the quantized spatial component. More information about the PAED 126 is provided with respect to the examples of FIGS. 3A and 3B, while more information about the PADD 134 is provided with respect to the examples of FIGS. 4A and 4B.

Figure 3A:
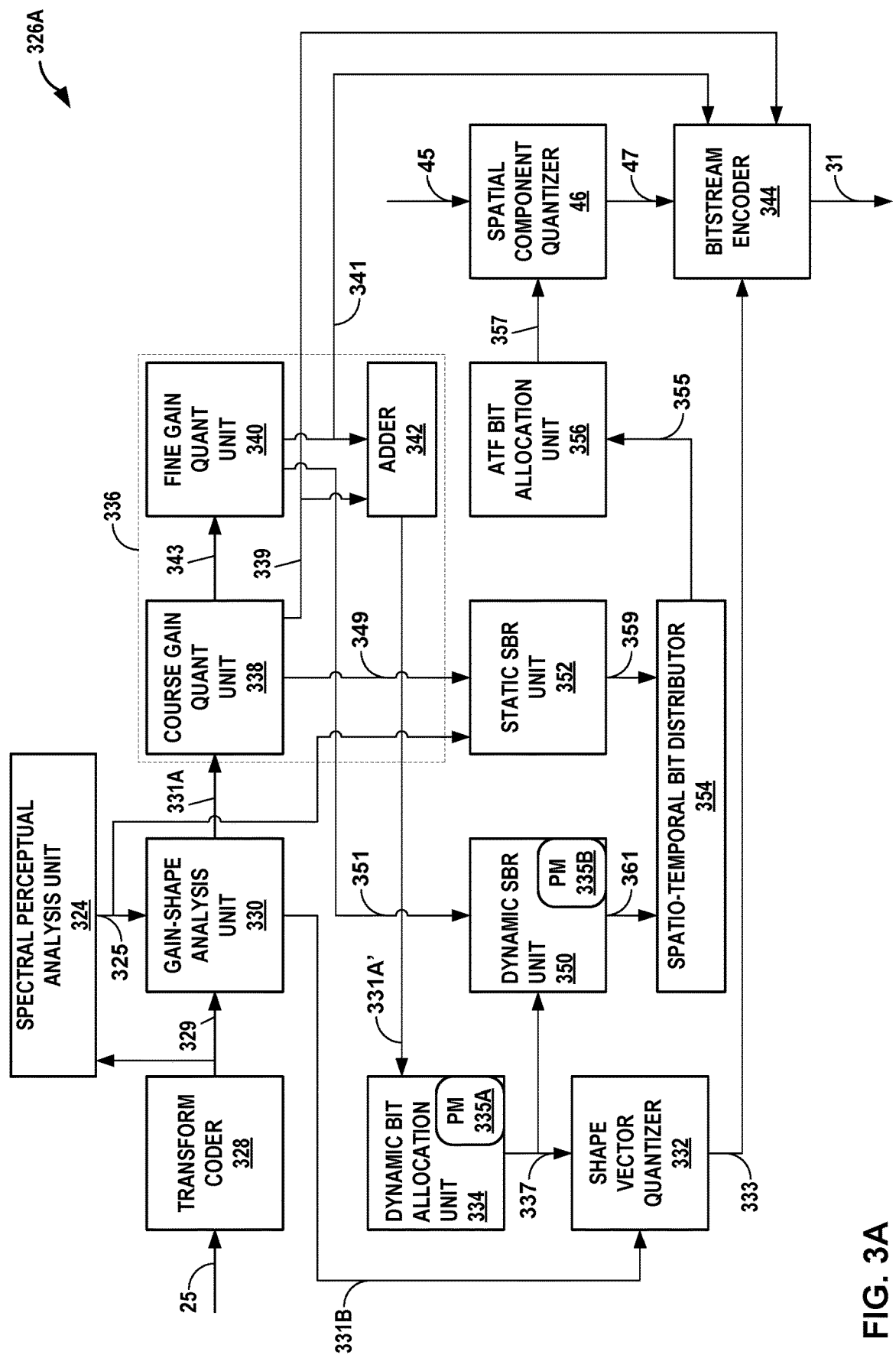
FIGS. 3A and 3B are block diagrams illustrating examples of the psychoacoustic audio encoder shown in the examples of FIGS. 1 and 2 in more detail.

FIG. 3A is a block diagram illustrating an example of the psychoacoustic audio encoder shown in the examples of FIGS. 1 and 2 in more detail. The PAED 326A may represent one example of the PAED 26 and 126, where the PAED 326A may be configured to encode audio data for transmission over a PAN (e.g., Bluetooth®) or any other form of wireless communication (such as a cellular wireless communication—so-called 3G, 4G and/or 5G wireless communication, WiFi™, etc.). However, the techniques of this disclosure performed by the audio encoder 326A may be used in any context where the compression of audio data is desired. In some examples, the audio encoder 326A may be configured to encode the audio data 25 in accordance with as aptX™ audio codec, including, e.g., enhanced aptX—E-aptX, aptX live, and aptX high definition. However, the techniques of this disclosure may be used in any audio codec. As will be explained in more detail below, the audio encoder 326A may be configured to perform various aspects of perceptual audio coding in accordance with various aspects of the techniques described in this disclosure.

In the example of FIG. 3A, the audio encoder 326A may be configured to encode the audio data 25 using a gain-shape vector quantization encoding process. In a gain-shape vector quantization encoding process, the audio encoder 326A is configured to encode both a gain (e.g., an energy level) and a shape (e.g., a residual vector defined by transform coefficients) separately of a sub-band of frequency domain audio data. Each sub-band of frequency domain audio data represents a certain frequency range of a particular frame of the audio data 25. In general, throughout this disclosure, the term "sub-band" represents a frequency range, a band, or the like.

The audio encoder 326A may first invoke a transform coder 328, which represents a unit configured to process the audio data 25. The transform unit 328 may be configured to process the audio data 25 by, at least in part, applying a transform to a frame of the audio data 25 and thereby transform the audio data 25 from a time domain to a frequency domain to produce frequency domain audio data 329.

A frame of the audio data 25 may be represented by a predetermined number of samples of the audio data. In one example, a frame of the audio data 25 may be 1024 samples wide. Different frame widths may be chosen based on the frequency transform being used and the amount of compression desired. The frequency domain audio data 329 may be represented as transform coefficients, where the value of each the transform coefficients represents an energy of the frequency domain audio data 329 at a particular frequency.

In one example, the transform unit 328 may be configured to transform the audio data 25 into the frequency domain audio data 329 using a modified discrete cosine transform (MDCT). An MDCT is a "lapped" transform that is based on a type-IV discrete cosine transform. The MDCT is considered "lapped" as it works on data from multiple frames. That is, in order to perform the transform using an MDCT, transform unit 328 may include a fifty percent overlap window into a subsequent frame of audio data. The overlapped nature of an MDCT may be useful for data compression techniques, such as audio encoding, as it may reduce artifacts from coding at frame boundaries. The transform unit 328 need not be constrained to using an MDCT but may use other frequency domain transformation techniques for transforming the audio data 25 into the frequency domain audio data 329.

Although not shown in the example of FIG. 3A, the PAED 326A may next invoke a sub-band filter, which may represent a unit configured to separate the frequency domain audio data 329 into sub-bands. Each of the sub-bands includes transform coefficients of the frequency domain audio data 329 in a particular frequency range. For instance, the sub-band filter may separate the frequency domain audio data 329 into twenty different sub-bands. In some examples, the sub-band filter may be configured to separate the frequency domain audio data 329 into sub-bands of uniform frequency ranges. In other examples, the sub-band filter may be configured to separate the frequency domain audio data 329 into sub-bands of non-uniform frequency ranges.

For example, the sub-band filter may be configured to separate the frequency domain audio data 329 into the sub-bands according to the Bark scale. In general, the sub-bands of a Bark scale have frequency ranges that are perceptually equal distances. That is, the sub-bands of the Bark scale are not equal in terms of frequency range, but rather, are equal in terms of human aural perception. In general, sub-bands at the lower frequencies will have fewer transform coefficients, as lower frequencies are easier to perceive by the human aural system.

As such, the frequency domain audio data 329 in lower frequency sub-bands of the sub-bands is less compressed by the PAED 326A, as compared to higher frequency sub-bands. Likewise, higher frequency sub-bands of the sub-bands may include more transform coefficients, as higher frequencies are harder to perceive by the human aural system. As such, the frequency domain audio 329 in data in higher frequency sub-bands of the sub-bands may be more compressed by the PAED 326A, as compared to lower frequency sub-bands.

The PAED 326A may be configured to process each of the sub-bands using a sub-band processing unit. That is, the sub-band processing unit may be configured to process each of sub-bands separately. The sub-band processing unit may be configured to perform a gain-shape vector quantization process.

A gain-shape analysis unit 330 may receive the sub-bands as an input. For each of sub-bands, the gain-shape analysis unit 330 may determine an energy level 331A of each of the sub-bands. That is, each of sub-bands has an associated energy level 331A. The energy level 331A is a scalar value in units of decibels (dBs) that represents the total amount of energy (also called gain) in the transform coefficients of a particular one of the sub-bands. The gain-shape analysis unit 330 may separate energy level 331A for one of the sub-bands from the transform coefficients of the sub-bands to produce residual vector 331B. The residual vector 331B represents the so-called "shape" of the sub-band. The shape of the sub-band may also be referred to as the spectrum of the sub-band.

In order to perform the gain-shape analysis, the PAED 326A may invoke the spectral perceptual analysis unit 324, which may represent a unit configured to analyze the frequency domain audio data 329 to identify perceptual importance of each of the sub-bands relative to the other soundbands (potentially both temporally and between the sub-bands for the same time segment). The spectral perceptual analysis unit 324 may identify which of the sub-bands should be subjected to the gain-shape analysis, outputting an indication 325 to the gain-shape analysis unit 330 and the static spatial bit redistribution unit 352. The gain-shape analysis unit 330 may then perform, based on the indication 325, the gain-shape analysis discussed above with respect to the sub-bands.

A vector quantizer 332 may represent a unit configured to quantize the residual vector 331B. In one example, the vector quantizer 332 may quantize the residual vector using a quantization process to produce the residual ID 333. Instead of quantizing each sample separately (e.g., scalar quantization), the vector quantizer 332 may be configured to quantize a block of samples included in the residual vector 332 (e.g., a shape vector).

In some examples, the PAED 326A may dynamically allocate bits for coding the energy level 331A and the residual vector 331B. That is, for each of the sub-bands, the PAED 326A may invoke dynamic bit allocation unit 334, which may represent a unit configured to determine the number of bits allocated for energy quantization (e.g., by energy quantizer 336) and the number of bits allocated for vector quantization (e.g., by the vector quantizer 332).

The dynamic bit allocation unit 334 may allocate bits for each shape vector 331B according to a psychoacoustic model 335A ("PM 335A"), which may attempt to model a human auditory system and thereby identify redundant, imperceptible, masked and/or other aspects of the soundfield incapable of being perceived. The dynamic bit allocation unit 334 may then allocate bits according to the PM 335A, reducing or eliminating bits for components of the soundfield that are incapable of being perceived by the human auditory system or redundant within the soundfield. The total number of bits allocated for energy quantization may be referred to as energy-assigned bits. The allocated bits may then be allocated between a coarse quantization process and a fine quantization process, as well as the vector quantization process.

The dynamic bit allocation unit 334 may obtain a reconstructed energy from the adder 342, which may reconstruct (via addition) the energy 331A' based on the course energy 339 and the fine energies 341. The dynamic bit allocation unit 334 may apply the PM 335A to the reconstructed energy 331A' in order to obtain a bit allocation 337. The dynamic bit allocation unit 334 may output the bit allocation 337 to the shape vector quantizer 332, a dynamic spatial bit redistribution unit 350, and although not shown in the example of FIG. 3A, the energy quantizer 336.

An energy quantizer 336 may receive the energy level 331A of the sub-bands and quantize the energy level 336 of the sub-bands into a coarse energy 339 and a fine energy 341. This disclosure will describe the quantization process for one sub-band, but it should be understood that the energy quantizer 336 may perform energy quantization on one or more of the sub-bands, including each of the sub-bands.

As shown in the example of FIG. 3A, the energy quantizer 336 may include a coarse gain quantization ("CGQ") unit 338, a fine gain quantization ("FGQ") unit 340, and an adder 342. Although not shown in the example of FIG. 3A, the energy quantizer 336 may further include a predictive difference (P/D) unit may predict or otherwise identify a difference between energy levels 331A for one of the sub-bands and another one of the sub-bands of the same frame of audio data (which may refer to spatial—in the frequency domain—prediction) or a same (or possibly a different) one of the sub-bands from a different frame (which may be referred to as temporal prediction). The P/D unit may analyze the energy levels 331A in this manner to obtain predicted energy levels ("PEL") for each of the sub-bands. The P/D unit may output the predicted energy levels to the coarse quantization unit 338.

The CGQ unit 338 may represent a unit configured to perform coarse quantization with respect to the predicted energy levels to obtain the quantized coarse energy 339. The CGQ unit 338 may output the quantized coarse energy 339 to the bitstream encoder 344 and the adder 342. The CGQ unit 338 may also obtain a difference of the quantized coarse energy 339 and the predicted energy level. The CGQ unit 338 may output the difference as error 343 (which may also be referred to as "residual 343") to the FGQ unit 340.

The FGQ unit 340 may represent a unit configured to perform fine quantization with respect to the error 343. The fine quantization may be considered "fine" relative to the coarse quantization performed by the coarse quantization unit 338. That is, the fine quantization unit 340 may quantize according to a step size having a higher resolution than the step size used when performing the coarse quantization, thereby further quantizing the error 343. The FGQ unit 340 may obtain a quantized fine energy 341 for each for the sub-bands as a result of performing the fine quantization with respect to the error 343. The fine quantization unit 340 may output the quantized fine energy 341 to the bitstream encoder 344.

In general, the energy quantizer 336 may perform a multi-step quantization process. The energy quantizer 336 may first quantize the energy level 338 with a first number of bits for a coarse quantization process to generate the coarse energy 339. The energy quantizer 336 may generate the coarse energy using a predetermined range of energy levels for the quantization (e.g., the range defined by a maximum and a minimum energy level. The coarse energy 339 approximates the value of the energy level 331A.

The energy quantizer 336 may then determine a difference between the coarse energy 339 and the predicted energy level. This difference is sometimes called a quantization error (or, residual). The energy quantizer 336 may then quantize the quantization error using a second number of bits in a fine quantization process to produce the fine energy 341. The number of bits used for the fine quantization bits is determined by the total number of energy-assigned bits minus the number of bits used for the coarse quantization process. When added together, the coarse energy 339 and the fine energy 341 represent a total quantized value of the energy level 331A.

The PAED 326A may be further configured to encode the coarse energy 339, the fine energy 341, and the residual ID 333 using a bitstream encoder 344 to create the encoded audio data 31. The bitstream encoder 344 may be configured to further compress the coarse energy 339, the fine energy 341, and the residual ID 333 using one or more of the above noted entropy encoding processes.

The energy quantizer 336 (and/or components thereof, such as the FGQ unit 340) may implement a hierarchical rate control mechanism to provide a greater degree of scalability and to achieve a seamless or substantially seamless real-time streaming. For instance, the FGQ unit 340 may implement a hierarchical fine quantization scheme according to aspects of this disclosure. In some examples, the FGQ unit 340 invokes a multiplexer (or "MUX") to implement selection operations of the hierarchical rate control.

The term "coarse quantization" refers to the combined operations of the two-step coarse-fine quantization processes described above. The FGQ unit 340 may perform one or more additional iterations of fine quantization with respect to the error 343 received from the CGQ unit 338. The FGQ unit 340 may use the multiplexer to switch between and traverse various fine(r) energy levels.

The hierarchical rate control may refer to a tree-based fine quantization structure or a cascaded fine quantization structure. When viewed as a tree-based structure, the existing two-step quantization operation forms a root node of the tree, and the root node is described as having a resolution depth of one (1). Depending on availability of bits for further fine quantization, the multiplexer may select additional level(s) of fine-grained quantization. Any such subsequent fine quantization levels selected by the multiplexer represent resolution depths of two (2), three (3), and so on, with respect to the tree-based structure that represents the multiple-level fine quantization techniques of this disclosure.

The FGQ unit 340 may provide improved scalability and control with respect to seamless real-time streaming scenarios in a wireless PAN. For instance, the FGQ unit 340 may replicate the hierarchical fine quantization scheme and quantization multiplexing tree at higher level hierarchies, seeded at coarse quantization points of a more general decision tree. Moreover, the FGQ unit 340 may enable the PAED 326 to achieve seamless or substantially seamless real-time compression and streaming navigation. For instance, the FGQ unit 340 may perform a multiple-root hierarchical decision structure with respect to multiple-level fine quantization, thereby enabling the energy quantizer 336 to utilize the total available bits to implement potentially several iterations of fine quantization.

The FGQ unit 340 may implement the hierarchical rate control processes in a variety of ways. The FGQ unit 340 may invoke the multiplexer on a per-sub-band basis to independently multiplex (and thereby select a respective tree-based quantization scheme) for error 343 information pertaining to each one of the sub-bands. That is, in these examples, the FGQ unit 340 performs a multiplexing-based hierarchical quantization mechanism selection for each respective sub-band independently of the quantization mechanism selection for any other ones of the sub-bands. In these examples, the FGQ unit 340 quantizes each of the sub-bands according to a target bitrate specified with respect to the respective sub-band only. In these examples, the PAED 326A may signal, as part of the encoded audio data 31, details of the particular hierarchical quantization scheme for each of the sub-bands.

In other examples, the FGQ unit 340 may invoke the multiplexer just once, and thereby select a single multiplexing-based quantization scheme for the error 343 information pertaining to all of the sub-bands. That is, in these examples, the FGQ unit 340 quantizes the error 343 information pertaining to all of the sub-bands according to the same target bitrate, which is selected a single time and defined uniformly for all of the sub-bands. In these examples, the PAED 326A may signal, as part of the encoded audio data 31, details of the single hierarchical quantization scheme applied across all of the sub-bands.

As further shown in the example of FIG. 3A, the CGQ unit 338 may output a bit allocation 349 for the course energy 339 to the static spatial bit redistribution unit 352. The bit allocation 349 may define a number of bits allocated to the course gain 339. The FGQ unit 340 may output a bit allocation 351 for each of the one or more fine energies 341 to the dynamic spatial bit redistribution unit 350. The bit allocation 351 may define a number of bits allocated to each of the one or more fine gains 341.

The static spatial bit redistribution ("SBR") unit 352 may represent a unit configured to redistribute, based on the indication 325 of the spectral perceptual importance (from the spectral perceptual analysis unit 324) and the bit allocation 349 for the course energy 339, bits between different course energies 339 for the different sub-bands to achieve a target bitrate (which is typically defined prior to encoding or is determined based on various operating conditions, such as communication link bandwidth, communication link signal-to-noise—SNR, battery level, or other conditions). The static SBR unit 352 may output a bit redistribution 359 (which may also be referred to as a "static spatial bit distribution 359") to the spatio-temporal bit distributor 354.

The dynamic SBR unit 350 may represent a unit configured to redistribute bits between different sub-bands based on the dynamic bit allocation 337 and the bit allocation 351 for the fine energies 341. The dynamic SBR unit 350 may operate in accordance with a PM 335B, which may be similar or substantially similar to the PM 335A, to obtain a bit redistribution 361 (which may also be referred to as a "dynamic spatial bit distribution 351"). The dynamic SBR unit 350 may output the bit redistribution 361 to the spatio-temporal bit distributor 354.

The spatio-temporal bit distributor 354 may then determine, based on the bit distributions 361 and 359, a spatio-temporal bit distribution 355. The spatio-temporal bit distribution 355 is both spatial and temporal as the spatial component defines the spatial characteristics of the foreground audio signal over time. The spatio-temporal bit distributor 354 may determine the spatio-temporal bit distribution 355 to achieve the target bitrate. The spatio-temporal bit distributor 354 may output the spatio-temporal bit distribution 355 to the ATF bit allocation unit 356.

The ATF bit allocation unit 356 may represent a unit configured to determine, based on the spatio-temporal bit distribution 355, a spatial component bit allocation 357. The ATF bit allocation unit 356 may determine the spatial component bit allocation 357 based on the target bitrate, allocating some of the bits to the foreground audio signal and the background audio signals, and the remaining bits to the spatial component. The ATF bit allocation unit 356 may output the spatial component bit allocation 357 to the spatial component quantizer 46, which may operate as described above to quantize, based on the spatial component bit allocation 357, a spatial component 45 to obtain a quantized spatial component 47.

In this respect, the PAED 326A may invoke gain-shape analysis unit 330 to perform a shape and gain analysis with respect to the foreground audio signal (represented by the frequency domain audio data 329) to obtain a shape 331B and a gain 331A representative of the foreground audio signal. The PAED 326A may then perform quantization with respect to the gain 331A to obtain a course gain 339 and one or more fine residuals 341. The PAED 326A may invoke the dynamic SBR unit 350 and the static SBR unit 352 to determine (respectively) bit allocations 361 and 359, which the spatio-temporal bit distributor 354 may process to obtain the spatio-temporal bit distribution 355. Based the spatio-temporal bit distribution 355, the ATF bit allocation unit 356 may determine the spatial component bit distribution 357.

Figure 3B:
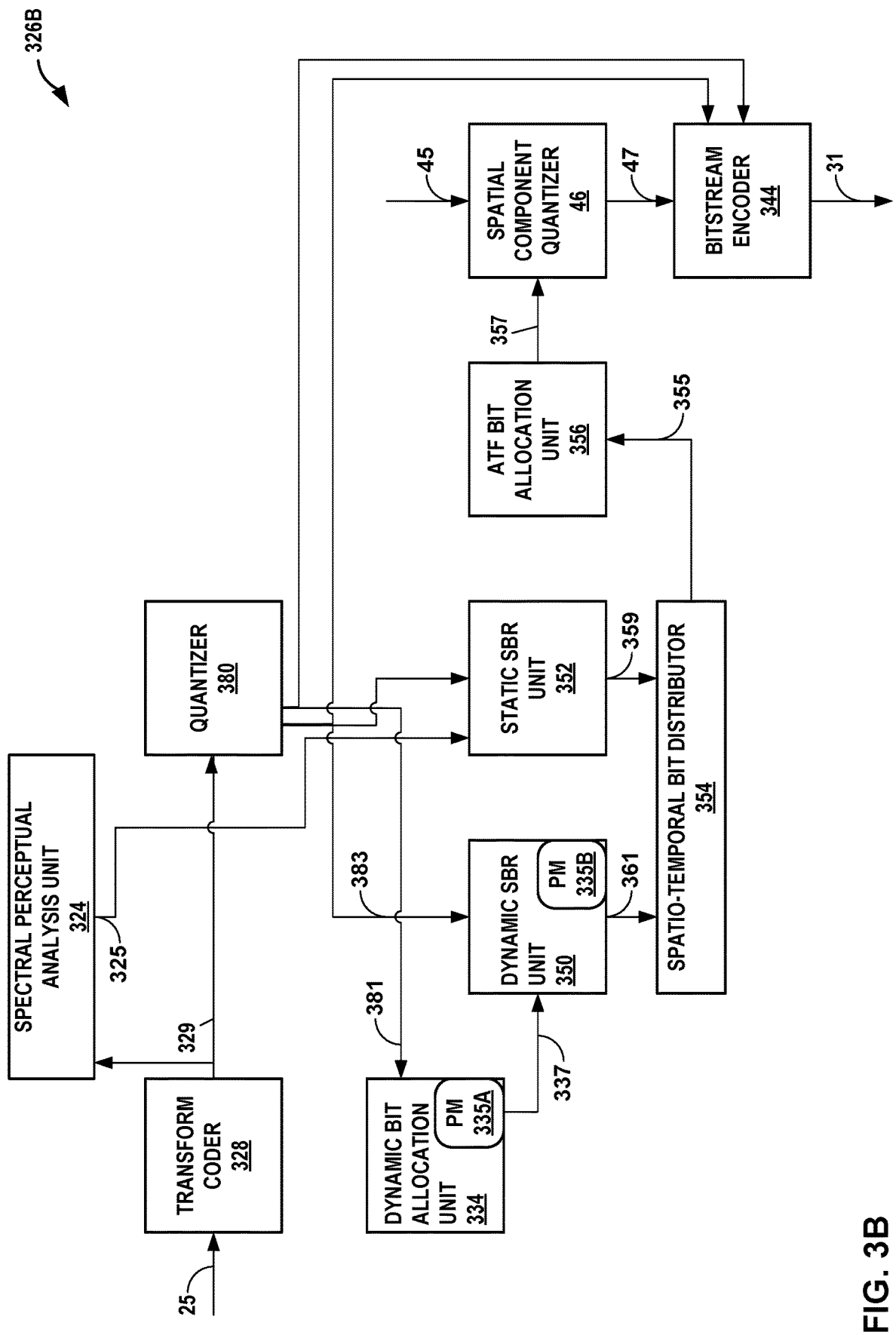

Referring next to the example of FIG. 3B, the PAED 326B may represent another example of the PAED 26 and/or 126 shown in the examples of FIGS. 1 and 2. As such, the PAED 326B may be similar to the PAED 326A, except that the PAED 326B does not include a gain-shape analysis unit 330, a shape vector quantizer 332, and a hierarchical course-fine gain quantization units 336 (including the course gain quantization unit 338, fine gain quantization unit 340, and adder 342).

Instead, the PAED 326B includes a general quantizer 380 that quantizes the frequency domain audio data 329 to produce quantized audio data 381, which is output to dynamic bit allocation unit 334 and bitstream encoder 344. The quantizer 380 may perform any form of quantization, whether course/fine quantization, hierarchical quantization, multi-step quantization, single step quantization, dynamic quantization, and/or static quantization. The quantizer 380 also outputs a bit allocation to the dynamic SBR unit 350, the static SBR unit 352, and the bitstream encoder 344.

Figure 4A:
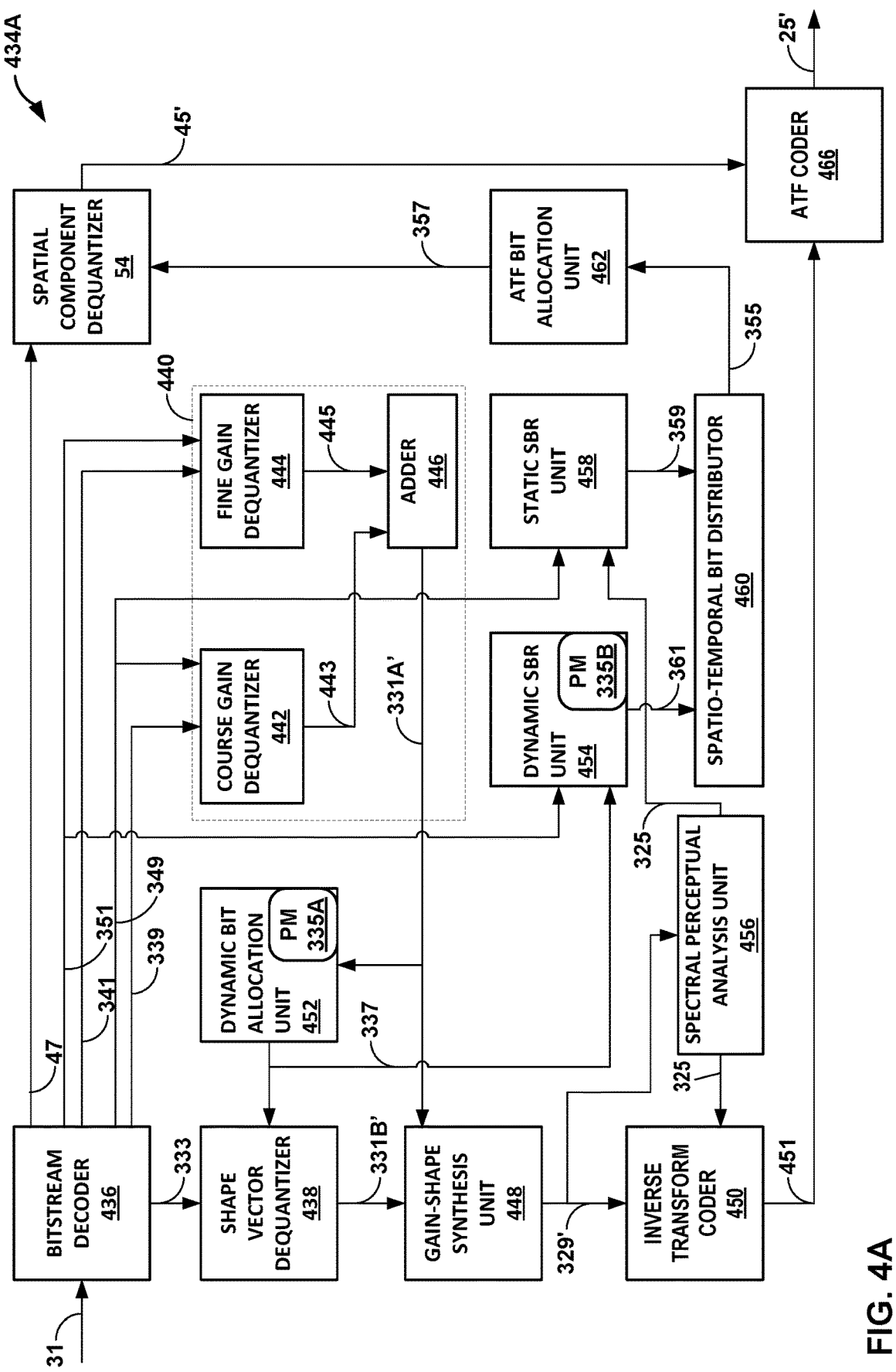
FIGS. 4A and 4B are block diagrams illustrating examples of the psychoacoustic audio decoder of FIGS. 1 and 2 in more detail.
Figure 4B:
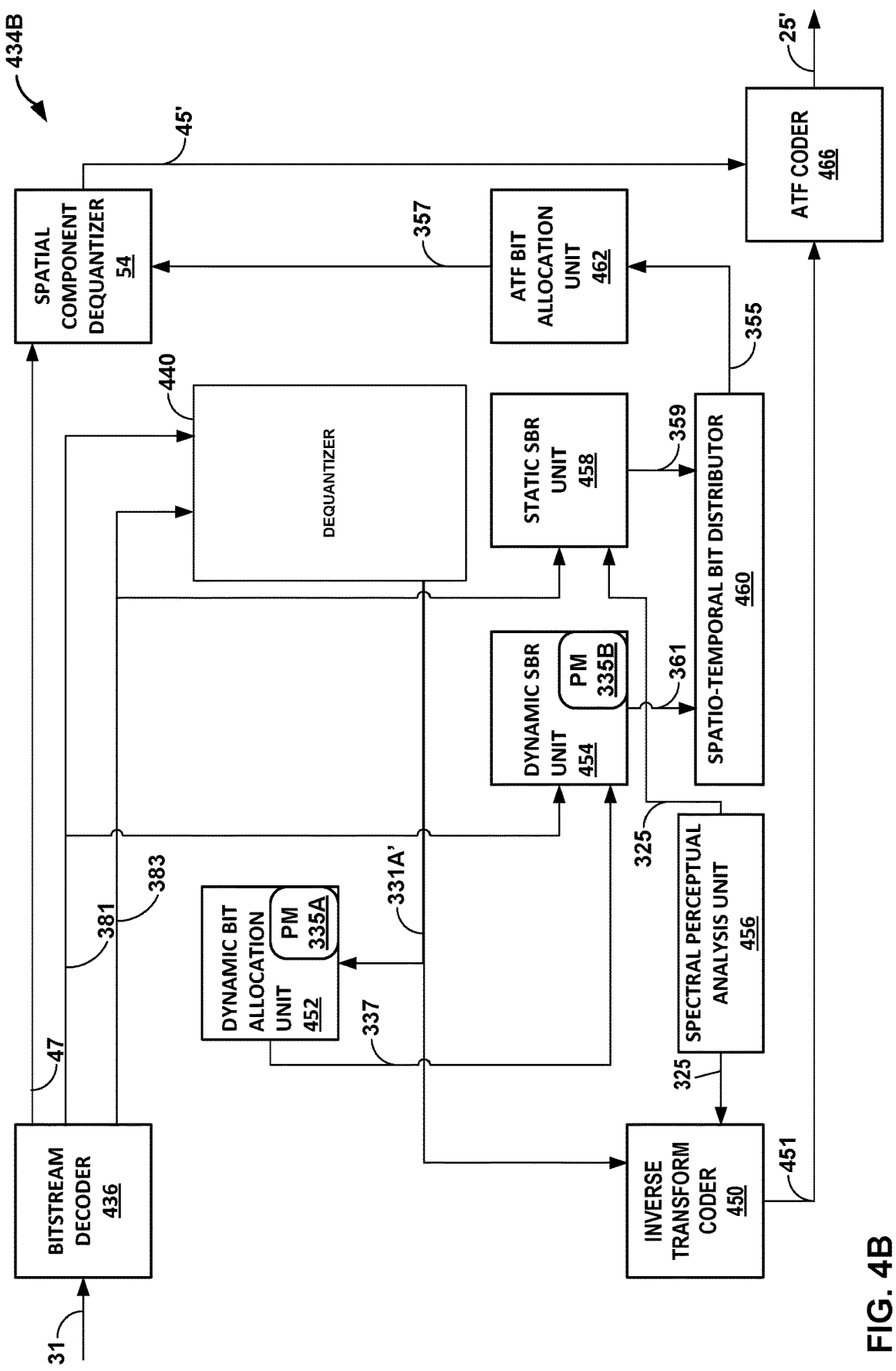

FIGS. 4A and 4B are block diagrams illustrating examples of the psychoacoustic audio decoder of FIGS. 1 and 2 in more detail. In the example of FIG. 4A, the PADD 434A represents another example of the PADD 34 and the PADD 134 shown in the examples of FIGS. 1 and 2. The PADD 434A may represent an audio decoder configured to perform psychoacoustic audio decoding in accordance with an AptX decompression algorithm.

As further shown in the example of FIG. 4A, the PADD 434A includes a bitstream decoder 436, a shape vector dequantizer 438, an energy dequantizer 440 (including a course gain dequantizer 442, a fine gain dequantizer 444, an adder 446), a gain-shape synthesis unit 448, and an inverse transform coder 450. The bitstream decoder 436 may represent a unit configured to extract the coarse energy 339, the fine energy 341, and the residual ID 333 from the encoded audio data 31. The bitstream decoder 436 may extract, based on the course energy bit allocation 349 and the fine energy bit allocation 351, one or more of the coarse energy 339, the fine energy 341, and the residual ID 333. The bitstream decoder 436 may output the coarse energy 339 to the course gain dequantizer 442, the quantized fine energy 341 to the fine gain dequantizer 444, and the residual ID 333 to the shape vector dequantizer 438.

The energy dequantizer 440 may represent a unit configured to perform dequantization in a manner reciprocal to the quantization performed by the energy quantizer 336 illustrated in FIG. 3A. The energy dequantizer 336 may perform dequantization with respect to the coarse energy 339 and the fine energy 441 to obtain the predicted/difference energy levels, which the energy dequantizer 336 may perform inverse prediction or difference calculations to obtain the energy level 331A'. The energy dequantizer 440 may output the energy level 331A' to the gain-shape synthesis unit 448.

If the encoded audio data 31 includes a syntax element set to a value indicating that the fine energy 349 was quantized hierarchically, then the energy dequantizer 440 may hierarchically dequantize the fine energy 341. In some examples, the encoded audio data 31 may include a syntax element that indicates whether the hierarchically-quantized fine energy 349 was formed using the same hierarchical quantization structure across all of the sub-bands, or a respective hierarchical quantization structure was determined individually with respect to each of the sub-bands. Based on the value of the syntax element, the energy dequantizer 440 may either apply the same hierarchical dequantization structure across all of the sub-bands as represented by the fine energy 341 or may update the hierarchical dequantization structure on a per-sub-band basis when dequantizing the fine energy 341.

In operation, the bitstream decoder 436 may parse, from the bitstream 31, the bit allocation 349 for the course energy 339, and provide the bit allocation 349 to the course gain dequantizer 442. The course gain dequantizer 442 may represent a unit configured to perform dequantization, based on the bit allocation 349, with respect to the course gain 339 to obtain dequantized course energy 443. The course gain dequantizer 442 may output the dequantized course energy 443 to the adder 446.

The bitstream decoder 436 may parse, from the bitstream 31, the bit allocation 351 for the fine energy 341, and provide the bit allocation 351 to the fine gain dequantizer 444. The fine gain dequantizer 444 may represent a unit configured to perform dequantization, based on the bit allocation 351, with respect to the fine gain 341 to obtain dequantized fine energy 445. The fine gain dequantizer 444 may output the dequantized fine energy 445 to the adder 446.

The adder 446 may represent a unit configured to sum or, in other words, add the dequantized course gain 443 to the dequantized fine gain 445 to obtain the energy level 331A', where the prime notation denotes that the energy level 331A' may differ from the energy level 331A as a result of the lossy quantization operation. The adder 446 may output the energy level 331A' to the gain-shape synthesis unit 448.

As noted above, the bitstream decoder 436 may parse the residual ID 333 to the shape vector dequantizer 438, which may represent a unit configured to perform vector dequantization in a manner reciprocal to the vector quantization performed by the shape vector quantizer 332. The shape vector dequantizer 438 may perform vector dequantization with respect to the residual ID 333 to obtain the residual vector 331B'. The shape vector dequantizer 438 may output the residual vector 331B' to the gain-shape synthesis unit 448, where again the prime notation for the residual vector 331B' denotes that the residual vector 331B' may differ from the residual vector 331B due to the lossy quantization operation.

The shape vector dequantizer 438 may perform vector dequantization based on a dynamically determined bit allocation 337. As further shown in the example of FIG. 4A, the PADD 434A includes a dynamic bit allocation unit 452, which may represent a unit configured to apply PM 335A to the dequantized energy level 331A' to obtain the dynamic bit allocation 337. The dynamic bit allocation unit 452 may operate in a manner similar, if not substantially similar, to the dynamic bit allocation unit 334 described above with respect to the example of FIG. 3A. The dynamic bit allocation unit 452 may output the dynamic bit allocation 337 to the shape vector dequantizer 438 and a dynamic SBR unit 454.

The gain-shape synthesis unit 448 may represent a unit configured to operate in manner reciprocal to the gain-shape analysis unit 330 (of FIG. 3A) to reconstruct the frequency domain audio data 329'. The gain-shape synthesis unit 448 may reconstruct, based on the energy level 331A' and the residual vector 331B', the frequency domain audio data 329', where again the prime notation for the frequency domain audio data 329' may denote slight differences between the frequency domain audio data 329' and the frequency domain audio data 329 due to lossy quantization operations. The gain-shape synthesis unit 448 may output the frequency domain audio data 329' to the inverse transform coder 450 and a spectral perceptual analysis unit 456.

The PADD 434A may include the spectral perceptual analysis unit 456, which may represent a unit configured to operate in a manner similar, if not substantially similar, to the spectral perceptual analysis unit 324 described above with respect to the example of FIG. 3A. The spectral perceptual analysis unit 456 may perform a spectral perceptual analysis with respect to the frequency domain audio data 329' to determine a spectral perceptual importance of the encoded foreground audio signal (represented by the frequency domain audio data 329') relative to the soundfield represented by the ATF audio data 25'. The spatial perceptual analysis unit 456 may output an indication 325 of the spectral perceptual importance to the inverse transform coder 450 and a static SBR unit 458.

The inverse transform coder 450 may represent a unit configured to operate in a manner that is reciprocal to the transform coder 328. As such, the inverse transform coder 450 may apply an inverse transform to the frequency domain audio data 329 to obtain transport channels 451, which may represent time-domain audio signals representative of the foreground audio signals (and potentially background audio signals). The inverse transform may transform the frequency-domain audio signals 329' from the frequency domain to the time-domain, where the time domain audio signals are representative of the transport channels 451. The inverse transform coder 450 may output the transport channels 451 to the ATF coder 466.

As further shown in the example of FIG. 4A, the PADD 434A may include a dynamic SBR unit 454 and a static SBR unit 458. The dynamic SBR unit 454 may represent a unit configured to operate in a manner similar, if not substantially similar, to the dynamic SBR unit 350. The dynamic SBR unit 454 may apply the PM 335B to the dynamic bit allocation 337 and the fine bit allocation 351 to obtain a dynamic bit redistribution 361. The dynamic SBR unit 454 may output the dynamic bit redistribution 361 to a spatio-temporal bit distributor 460.

The static SBR unit 458 may represent a unit configured to operate in a manner similar, if not substantially similar, to the static SBR unit 352. The static SBR unit 458 process the indication 325 and the course bit allocation 349 to obtain a static bit redistribution 359. The static SBR unit 458 may output the static bit redistribution 359 to the spatio-temporal bit distributor 460.

The PADD 434A may further, as shown in the example of FIG. 4A, include the spatio-temporal bit distributor 460, an ATF bit allocation unit 462, and the spatial component dequantizer 54. The spatio-temporal bit distributor 460 may represent a unit configured to operate in a manner similar, if not substantially similar, to the spatio-temporal bit distributor 354 described above with respect to the example of FIG. 3A. The spatio-temporal bit distributor 460 may process the dynamic bit redistribution 361 and the static bit redistribution 359 to obtain the spatio-temporal bit distribution 355. The spatio-temporal bit distributor 460 may output the spatio-temporal bit distribution 355 to the ATF bit allocation unit 462.

The ATF bit allocation unit 462 may represent a unit configured to operate in a manner similar, if not substantially similar, to the ATF bit allocation unit 356 described above with respect to the example of FIG. 3A. The ATF bit allocation unit 462 may process the spatio-temporal bit allocation 355 to obtain the spatial component bit allocation 357. The ATF bit allocation unit 462 may output the spatial component bit allocation 357 to the spatial component dequantizer 54.

The spatial component dequantizer 54 may represent a unit configured to operate in a manner reciprocal to the spatial component quantizer 46 described above with respect to the example of FIG. 3A. The spatial component dequantizer 54 may dequantize, based on the spatial component bit allocation 357, the spatial component 47 to obtain the dequantized spatial component 45'. The spatial component dequantizer 54 may output the dequantized spatial component 45' to the ATF coder 466.

The ATF coder 466 may represent a unit configured to reconstruct, based on the transport channels 451 and the dequantized spatial component 45', the ATF audio data 25'. The ATF coder 466 may multiplex the transport channels 451 and the dequantized spatial component 45' to formulate the ATF audio data 25' (such as in accordance with the HTF described above). The ATF coder 466 may output the ATF audio data 25' to the SADD 136 as described above.

Referring next to the example of FIG. 4B, PADD 434B may be similar to the PADD 434A shown in the example of FIG. 4A, except that PADD 434B does not include the shape vector dequantizer 438, and the gain-shape synthesis unit 448. Moreover, the energy dequantizer 440 of PADD 434B does not include the course/fine quantization and may perform any form of dequantization, whether course/fine dequantization, hierarchical dequantization, multi-step dequantization, single step dequantization, dynamic dequantization, and/or static dequantization. As such, the PADD 434B may operate reciprocally to the PAED 326B shown in the example of FIG. 3B.

Figure 5:
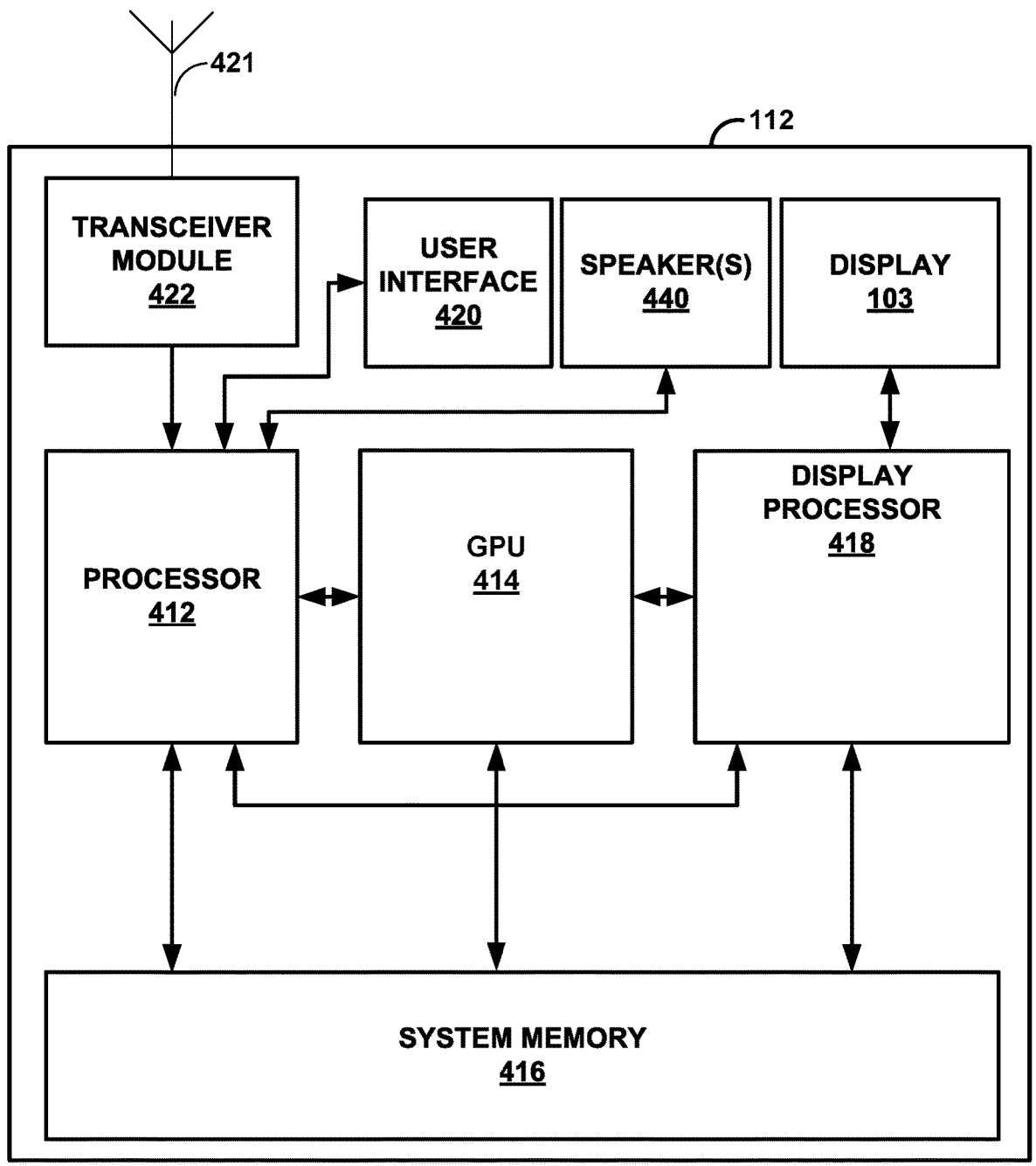
FIG. 5 is a block diagram illustrating example components of the source device shown in the example of FIG. 2.

FIG. 5 is a block diagram illustrating example components of the source device shown in the example of FIG. 2. In the example of FIG. 11, the source device 112 includes a processor 412, a graphics processing unit (GPU) 414, system memory 416, a display processor 418, one or more integrated speakers 140, a display 103, a user interface 420, antenna 421, and a transceiver module 422. In examples where the source device 112 is a mobile device, the display processor 418 is a mobile display processor (MDP). In some examples, such as examples where the source device 112 is a mobile device, the processor 412, the GPU 414, and the display processor 418 may be formed as an integrated circuit (IC).

For example, the IC may be considered as a processing chip within a chip package and may be a system-on-chip (SoC). In some examples, two of the processors 412, the GPU 414, and the display processor 418 may be housed together in the same IC and the other in a different integrated circuit (i.e., different chip packages) or all three may be housed in different ICs or on the same IC. However, it may be possible that the processor 412, the GPU 414, and the display processor 418 are all housed in different integrated circuits in examples where the source device 12 is a mobile device.

Examples of the processor 412, the GPU 414, and the display processor 418 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 412 may be the central processing unit (CPU) of the source device 12. In some examples, the GPU 414 may be specialized hardware that includes integrated and/or discrete logic circuitry that provides the GPU 414 with massive parallel processing capabilities suitable for graphics processing. In some instances, GPU 414 may also include general purpose processing capabilities, and may be referred to as a general-purpose GPU (GPGPU) when implementing general purpose processing tasks (i.e., non-graphics related tasks). The display processor 418 may also be specialized integrated circuit hardware that is designed to retrieve image content from the system memory 416, compose the image content into an image frame, and output the image frame to the display 103.

The processor 412 may execute various types of the applications 20. Examples of the applications 20 include web browsers, e-mail applications, spreadsheets, video games, other applications that generate viewable objects for display, or any of the application types listed in more detail above. The system memory 416 may store instructions for execution of the applications 20. The execution of one of the applications 20 on the processor 412 causes the processor 412 to produce graphics data for image content that is to be displayed and the audio data 21 that is to be played (possibly via integrated speaker 105). The processor 412 may transmit graphics data of the image content to the GPU 414 for further processing based on and instructions or commands that the processor 412 transmits to the GPU 414.

The processor 412 may communicate with the GPU 414 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 412 and the GPU 414 may utilize any technique for communication.

The system memory 416 may be the memory for the source device 12. The system memory 416 may comprise one or more computer-readable storage media. Examples of the system memory 416 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 416 may include instructions that cause the processor 412, the GPU 414, and/or the display processor 418 to perform the functions ascribed in this disclosure to the processor 412, the GPU 414, and/or the display processor 418. Accordingly, the system memory 416 may be a computer-readable storage medium having instructions stored thereon that, when executed, cause one or more processors (e.g., the processor 412, the GPU 414, and/or the display processor 418) to perform various functions.

The system memory 416 may include a non-transitory storage medium. The term "non-transitory" indicates that the storage medium is not embodied in a carrier wave or a propagated signal. However, the term "non-transitory" should not be interpreted to mean that the system memory 416 is non-movable or that its contents are static. As one example, the system memory 416 may be removed from the source device 12 and moved to another device. As another example, memory, substantially similar to the system memory 416, may be inserted into the source device 12. In certain examples, a non-transitory storage medium may store data that can, over time, change (e.g., in RAM).

The user interface 420 may represent one or more hardware or virtual (meaning a combination of hardware and software) user interfaces by which a user may interface with the source device 12. The user interface 420 may include physical buttons, switches, toggles, lights or virtual versions thereof. The user interface 420 may also include physical or virtual keyboards, touch interfaces—such as a touchscreen, haptic feedback, and the like.

The processor 412 may include one or more hardware units (including so-called "processing cores") configured to perform all or some portion of the operations discussed above with respect to one or more of the mixing unit 120, the audio encoder 122, the wireless connection manager 128, and the wireless communication units 130. The antenna 421 and the transceiver module 422 may represent a unit configured to establish and maintain the wireless connection between the source device 12 and the sink device 114. The antenna 421 and the transceiver module 422 may represent one or more receivers and/or one or more transmitters capable of wireless communication in accordance with one or more wireless communication protocols. That is, the transceiver module 422 may represent a separate transmitter, a separate receiver, both a separate transmitter and a separate receiver, or a combined transmitter and receiver. The antenna 421 and the transceiver 422 may be configured to receive encoded audio data that has been encoded according to the techniques of this disclosure. Likewise, the antenna 421 and the transceiver 422 may be configured to transmit encoded audio data that has been encoded according to the techniques of this disclosure. The transceiver module 422 may perform all or some portion of the operations of one or more of the wireless connection managers 128 and the wireless communication units 130.

Figure 6:
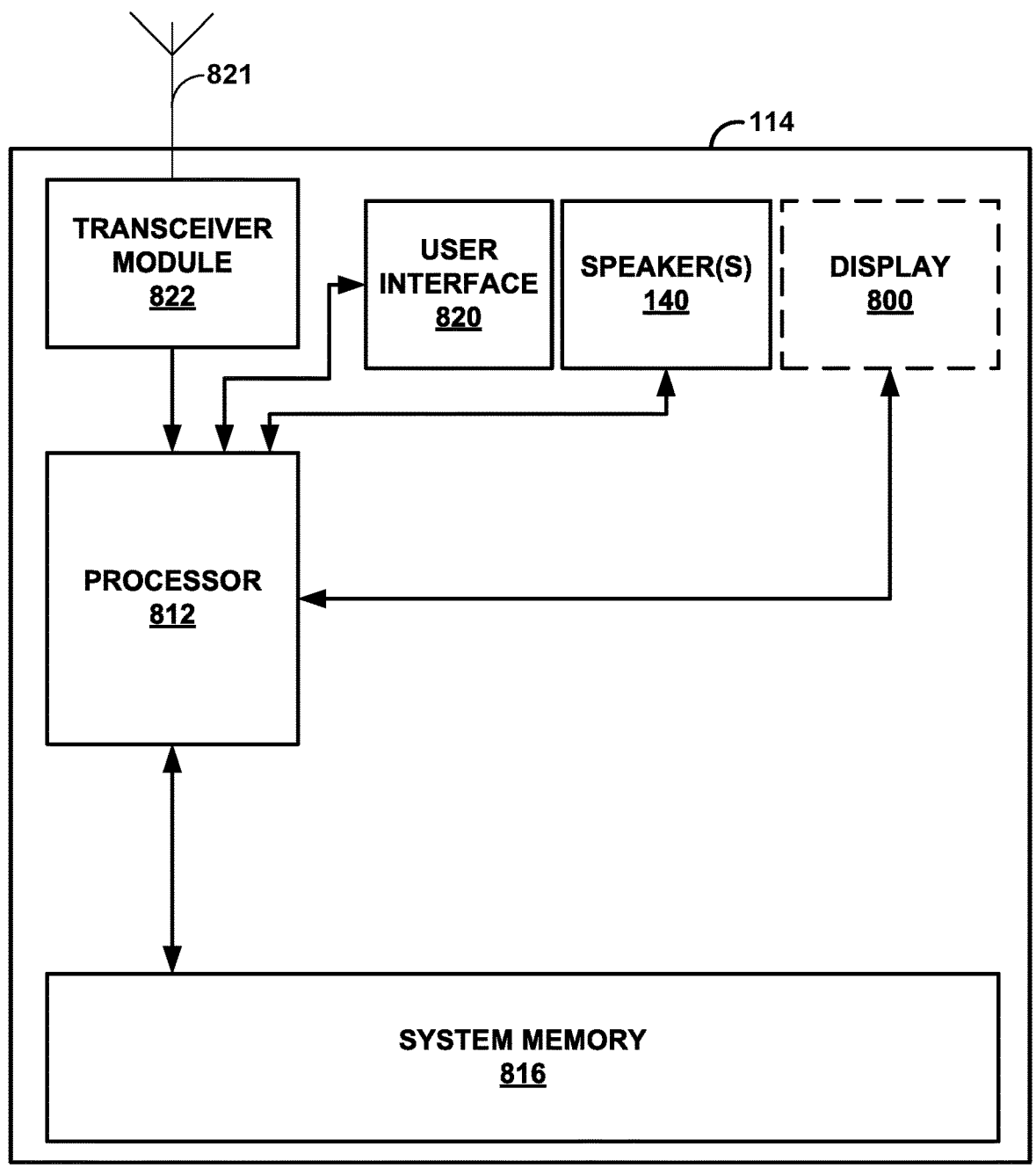
FIG. 6 is a block diagram illustrating exemplary components of the sink device shown in the example of FIG. 2.

FIG. 6 is a block diagram illustrating exemplary components of the sink device shown in the example of FIG. 2. Although the sink device 114 may include components similar to that of the source device 112 discussed above in more detail with respect to the example of FIG. 5, the sink device 14 may, in certain instances, include only a subset of the components discussed above with respect to the source device 112.

In the example of FIG. 6, the sink device 114 includes one or more speakers 802, a processor 812, a system memory 816, a user interface 820, an antenna 821, and a transceiver module 822. The processor 812 may be similar or substantially similar to the processor 812. In some instances, the processor 812 may differ from the processor 412 in terms of total processing capacity or may be tailored for low power consumption. The system memory 816 may be similar or substantially similar to the system memory 416. The speakers 140, the user interface 820, the antenna 821, and the transceiver module 822 may be similar to or substantially similar to the respective speakers 440, user interface 420, and transceiver module 422. The sink device 114 may also optionally include a display 800, although the display 800 may represent a low power, low resolution (potentially a black and white LED) display by which to communicate limited information, which may be driven directly by the processor 812.

The processor 812 may include one or more hardware units (including so-called "processing cores") configured to perform all or some portion of the operations discussed above with respect to one or more of the wireless connection managers 150, the wireless communication units 152, and the audio decoder 132. The antenna 821 and the transceiver module 822 may represent a unit configured to establish and maintain the wireless connection between the source device 112 and the sink device 114. The antenna 821 and the transceiver module 822 may represent one or more receivers and one or more transmitters capable of wireless communication in accordance with one or more wireless communication protocols. The antenna 821 and the transceiver 822 may be configured to receive encoded audio data that has been encoded according to the techniques of this disclosure. Likewise, the antenna 821 and the transceiver 822 may be configured to transmit encoded audio data that has been encoded according to the techniques of this disclosure. The transceiver module 822 may perform all or some portion of the operations of one or more of the wireless connection managers 150 and the wireless communication units 152.

Figure 7:
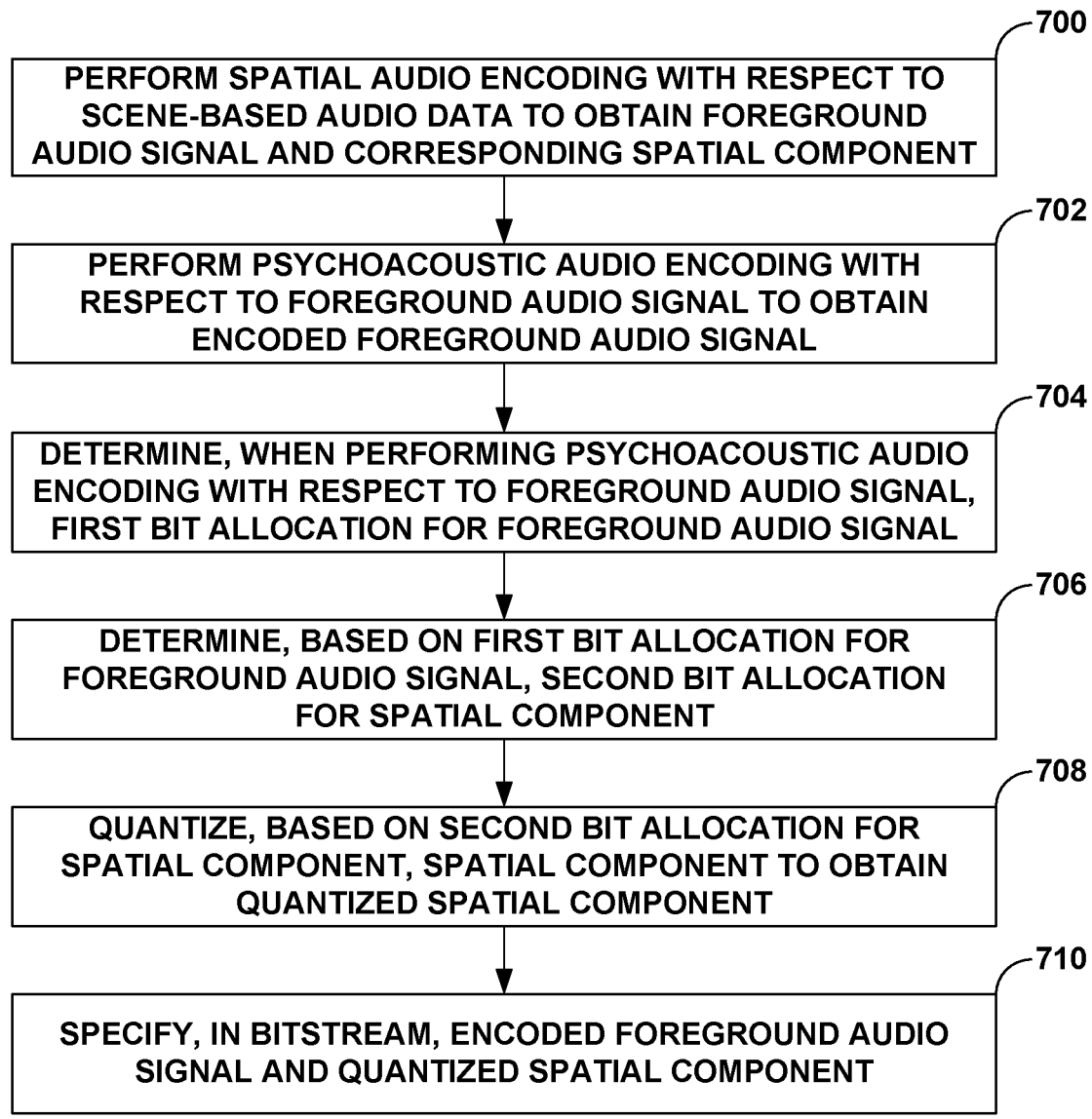
FIG. 7 is a flowchart illustrating example operation of the audio encoder shown in FIG. 1 in performing various aspects of the techniques described in this disclosure.

FIG. 7 is a flowchart illustrating example operation of the audio encoder shown in FIG. 1 in performing various aspects of the techniques described in this disclosure. The audio encoder 22 may first invoke the spatial audio encoding device 24 to perform spatial audio encoding with respect to the scene-based audio data 21 and thereby obtain the foreground audio signal and the corresponding spatial component (700). However, the spatial audio encoding performed by the spatial audio encoding device 24 omits the above noted quantization of the spatial component, as again quantization has been offloaded to the psychoacoustic audio encoding device 26. The spatial audio encoding device 24 may output the ATF audio data 25 representative of the foreground audio signal and the corresponding spatial component to the psychoacoustic audio encoding device 26.

The audio encoder 22 invokes the psychoacoustic audio encoding device 26 to perform psychoacoustic audio encoding with respect to the foreground audio signal to obtain an encoded foreground audio signal (702). The psychoacoustic audio encoding device 26 may determine, when performing psychoacoustic audio encoding with respect to the foreground audio signal, a first bit allocation for the foreground audio signal (704). The psychoacoustic audio encoding device 26 may determine, based on the first bit allocation for the foreground audio signal, a second bit allocation for the spatial component (706). As the second bit allocation is determined based on the first bit allocation, the psychoacoustic audio encoding device 26 more fully integrates quantization across the foreground audio signal and the spatial component. The psychoacoustic audio encoding device 26 may invoke the SCQ 46, passing the second bit allocation to the SCQ 46.

The SCQ 46 may apply quantization (such as vector quantization) to achieve the bit allocation for the spatial component that meets or exceeds the second bit allocation. As such, the SCO 46 may quantize, based on the second bit allocation for the spatial component, the spatial component to obtain a quantized spatial component (708). The psychoacoustic audio encoding device 26 may then specify, in the bitstream 31, the encoded foreground audio signal and the quantized spatial component (710).

Figure 8:
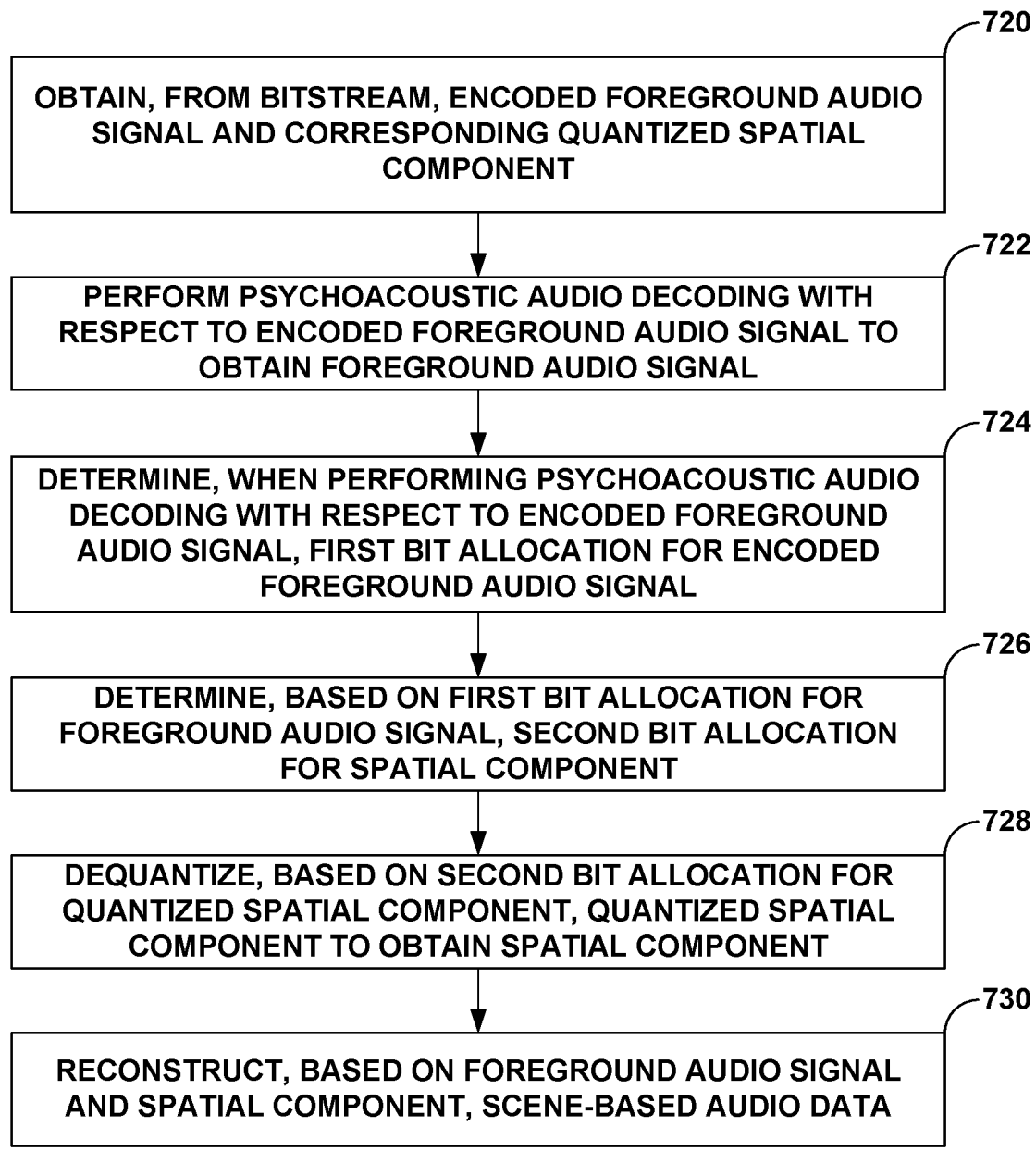
FIG. 8 is a flowchart illustrating example operation of the audio decoder shown in FIG. 1 in performing various aspects of the techniques described in this disclosure.

FIG. 8 is a flowchart illustrating example operation of the audio decoder shown in FIG. 1 in performing various aspects of the techniques described in this disclosure. The audio decoder 32 may, as noted above, operate reciprocally to the audio encoder 22. As such, the audio decoder 32 may obtain, from the bitstream 31, the encoded foreground audio signal and the corresponding quantized spatial component (720). The audio decoder 32 may invoke the psychoacoustic audio decoding device 34 to perform psychoacoustic audio decoding with respect to the encoded foreground audio signal to obtain the foreground audio signal (722).

When performing the psychoacoustic audio encoding with respect to the foreground audio signal, the psychoacoustic audio decoding device 34 may determine a first bit allocation for the encoded foreground audio signal (724). The psychoacoustic audio decoding device 34 may also determine, based on the first bit allocation for the encoded foreground audio signal, a second bit allocation for the quantized spatial component (726). The psychoacoustic audio decoding device 34 may invoke the spatial component dequantizer (SCD) 54, which may dequantize, based on the second bit allocation for the spatial component, the quantized spatial component to obtain the spatial component (728). The psychoacoustic audio decoding device 34 may reconstruct, based on the foreground audio signal and the spatial component, the ATF audio data 25'. The spatial audio decoding device 36 may then reconstruct, based on the foreground audio signal and the spatial component, the scene-based audio data 21' (730).

The foregoing aspects of the techniques may enable implementations according to the following clauses.

Clause 1B. A device configured to encode scene-based audio data, the device comprising: a memory configured to store scene-based audio data; and one or more processors configured to: perform spatial audio encoding with respect to the scene-based audio data to obtain a foreground audio signal and a corresponding spatial component, the spatial component defining spatial characteristics of the foreground audio signal; perform psychoacoustic audio encoding with respect to the foreground audio signal to obtain an encoded foreground audio signal; determine, when performing psychoacoustic audio encoding with respect to the foreground audio signal, a first bit allocation for the foreground audio signal; determine, based on the first bit allocation for the foreground audio signal, a second bit allocation for the spatial component; quantize, based on the second bit allocation for the spatial component, the spatial component to obtain a quantized spatial component; and specify, in a bitstream, the encoded foreground audio signal and the quantized spatial component.

Clause 2B. The device of clause 1B, wherein the one or more processors are configured to perform the psychoacoustic audio encoding according to an AptX compression algorithm with respect to the foreground audio signal to obtain the encoded foreground audio signal.

Clause 3B. The device of any combination of clauses 1B and 2B, wherein the one or more processors are configured to: perform a shape and gain analysis with respect to the foreground audio signal to obtain a shape and a gain representative of the foreground audio signal; perform quantization with respect to the gain to obtain a course quantized gain and one or more fine quantized residuals; and determine, based on a number of bits allocated to the course quantized gain and each of the one or more fine quantized residuals, the second bit allocation.

Clause 4B. The device of any combination of clauses 1B-3B, wherein the one or more processors are configured to: determine a spectral perceptual importance of the foreground audio signal relative to a soundfield represented by the scene-based audio data; and determine, based on the spectral perceptual importance, the first bit allocation.

Clause 5B. The device of clause 4B, wherein the one or more processors are configured to: determine, based on the spectral perceptual importance and the number of bits allocated to the course quantized gain, a static spatial bit distribution; determine, based on the number of bits allocated to each of the one or more fine quantized residuals, a dynamic spatial bit distribution; and determine, based on the static spatial bit distribution and the dynamic spatial bit distribution, the second bit allocation.

Clause 6B. The device of any combination of clauses 1B-5B, wherein the one or more processors are configured to perform a linear invertible transform with respect to the scene-based audio data to obtain the foreground audio signal and the corresponding spatial component.

Clause 7B. The device of any combination of clauses 1B-6B, wherein the scene-based audio data comprises ambisonic coefficients corresponding to an order greater than one.

Clause 8B. The device of any combination of clauses 1B-6B, wherein the scene-based audio data comprises ambisonic coefficients corresponding to an order greater than zero.

Clause 9B. The device of any combination of clauses 1B-8B, wherein the scene-based audio data comprises audio data defined in a spherical harmonic domain.

Clause 10B. The device of any combination of clauses 1B-9B, wherein the foreground audio signal comprises a foreground audio signal defined in the spherical harmonic domain, and wherein the spatial component comprises a spatial component defined in the spherical harmonic domain.

Clause 11B. The device of any combination of clauses 1B-10B, wherein the scene-based audio data includes mixed-order ambisonic audio data.

Clause 12B. A method of encoding scene-based audio data, the method comprising: performing spatial audio encoding with respect to the scene-based audio data to obtain a foreground audio signal and a corresponding spatial component, the spatial component defining spatial characteristics of the foreground audio signal; performing psychoacoustic audio encoding with respect to the foreground audio signal to obtain an encoded foreground audio signal; determining, when performing psychoacoustic audio encoding with respect to the foreground audio signal, a first bit allocation for the foreground audio signal; determining, based on the first bit allocation for the foreground audio signal, a second bit allocation for the spatial component; quantizing, based on the second bit allocation for the spatial component, the spatial component to obtain a quantized spatial component; and specifying, in a bitstream, the encoded foreground audio signal and the quantized spatial component.

Clause 13B. The method of clause 12B, wherein performing the psychoacoustic audio comprises encoding comprises performing the psychoacoustic audio encoding according to an AptX compression algorithm with respect to the foreground audio signal to obtain the encoded foreground audio signal.

Clause 14B. The method of any combination of clauses 12B and 13B, wherein determining the first bit allocation comprises: performing a shape and gain analysis with respect to the foreground audio signal to obtain a shape and a gain representative of the foreground audio signal; performing quantization with respect to the gain to obtain a course quantized gain and one or more fine quantized residuals; and determining, based on a number of bits allocated to the course quantized gain and each of the one or more fine quantized residuals, the second bit allocation.

Clause 15B. The method of any combination of clauses 12B-14B, wherein determining the first bit allocation comprises: determining a spectral perceptual importance of the foreground audio signal relative to a soundfield represented by the scene-based audio data; and determining, based on the spectral perceptual importance, the first bit allocation.

Clause 16B. The method of clause 15B, wherein determining the second bit allocation comprises: determine, based on the spectral perceptual importance and the number of bits allocated to the course quantized gain, a static spatial bit distribution; determine, based on the number of bits allocated to each of the one or more fine quantized residuals, a dynamic spatial bit distribution; and determine, based on the static spatial bit distribution and the dynamic spatial bit distribution, the second bit allocation.

Clause 17B. The method of any combination of clauses 12B-16B, wherein performing the spatial audio encoding comprises performing a linear invertible transform with respect to the scene-based audio data to obtain the foreground audio signal and the corresponding spatial component.

Clause 18B. The method of any combination of clauses 12B-17B, wherein the scene-based audio data comprises ambisonic coefficients corresponding to an order greater than one.

Clause 19B. The method of any combination of clauses 12B-17B, wherein the scene-based audio data comprises ambisonic coefficients corresponding to an order greater than zero.

Clause 20B. The method of any combination of clauses 12B-19B, wherein the scene-based audio data comprises audio data defined in a spherical harmonic domain.

Clause 21B. The method of any combination of claims 12B-20B, wherein the foreground audio signal comprises a foreground audio signal defined in the spherical harmonic domain, and wherein the spatial component comprises a spatial component defined in the spherical harmonic domain.

Clause 22B. The method of any combination of clauses 12B-21B, wherein the scene-based audio data includes mixed-order ambisonic audio data.

Clause 23B. A device configured to encode scene-based audio data, the device comprising: means for performing spatial audio encoding with respect to the scene-based audio data to obtain a foreground audio signal and a corresponding spatial component, the spatial component defining spatial characteristics of the foreground audio signal; means for performing psychoacoustic audio encoding with respect to the foreground audio signal to obtain an encoded foreground audio signal; means for determining, when performing psychoacoustic audio encoding with respect to the foreground audio signal, a first bit allocation for the foreground audio signal; means for determining, based on the first bit allocation for the foreground audio signal, a second bit allocation for the spatial component; means for quantizing, based on the second bit allocation for the spatial component, the spatial component to obtain a quantized spatial component; and means for specifying, in a bitstream, the foreground audio signal and the quantized spatial component.

Clause 24B. The device of clause 23B, wherein the means for performing the psychoacoustic audio comprises means for encoding comprises performing the psychoacoustic audio encoding according to an AptX compression algorithm with respect to the foreground audio signal to obtain the encoded foreground audio signal.

Clause 25B. The device of any combination of clauses 23B and 24B, wherein the means for determining the first bit allocation comprises: means for performing a shape and gain analysis with respect to the foreground audio signal to obtain a shape and a gain representative of the foreground audio signal; means for performing quantization with respect to the gain to obtain a course quantized gain and one or more fine quantized residuals; and means for determining, based on a number of bits allocated to the course quantized gain and each of the one or more fine quantized residuals, the second bit allocation.

Clause 26B. The device of any combination of clauses 23B-25B, wherein the means for determining the first bit allocation comprises: means for determining a spectral perceptual importance of the foreground audio signal relative to a soundfield represented by the scene-based audio data; and means for determining, based on the spectral perceptual importance, the first bit allocation.

Clause 27B. The device of clause 26B, wherein the means for determining the second bit allocation comprises: means for determine, based on the spectral perceptual importance and the number of bits allocated to the course quantized gain, a static spatial bit distribution; means for determine, based on the number of bits allocated to each of the one or more fine quantized residuals, a dynamic spatial bit distribution; and means for determine, based on the static spatial bit distribution and the dynamic spatial bit distribution, the second bit allocation.

Clause 28B. The device of any combination of clauses 23B-27B, wherein the means for performing the spatial audio encoding comprises means for performing a linear invertible transform with respect to the scene-based audio data to obtain the foreground audio signal and the corresponding spatial component.

Clause 29B. The device of any combination of clauses 23B-28B, wherein the scene-based audio data comprises ambisonic coefficients corresponding to an order greater than one.

Clause 30B. The device of any combination of clauses 23B-29B, wherein the scene-based audio data comprises ambisonic coefficients corresponding to an order greater than zero.

Clause 31B. The device of any combination of clauses 23B-30B, wherein the scene-based audio data comprises audio data defined in a spherical harmonic domain.

Clause 32B. The device of any combination of clauses 23B-31B, wherein the foreground audio signal comprises a foreground audio signal defined in the spherical harmonic domain, and wherein the spatial component comprises a spatial component defined in the spherical harmonic domain.

Clause 33B. The device of any combination of clauses 23B-32B, wherein the scene-based audio data includes mixed-order ambisonic audio data.

Clause 34B. A non-transitory computer-readable storage medium having stored thereon instructions that, when executed, cause one or more processors to: perform spatial audio encoding with respect to scene-based audio data to obtain a foreground audio signal and a corresponding spatial component, the spatial component defining spatial characteristics of the foreground audio signal; perform psychoacoustic audio encoding with respect to the foreground audio signal to obtain an encoded foreground audio signal; determine, when performing psychoacoustic audio encoding with respect to the foreground audio signal, a first bit allocation for the foreground audio signal; determine, based on the first bit allocation for the foreground audio signal, a second bit allocation for the spatial component; quantize, based on the second bit allocation for the spatial component, the spatial component to obtain a quantized spatial component; and specify, in a bitstream, the foreground audio signal and the quantized spatial component.

Clause 1C. A device configured to decode a bitstream representative of encoded scene-based audio data, the device comprising: a memory configured to store the bitstream, the bitstream including an encoded foreground audio signal and a corresponding quantized spatial component that defines spatial characteristics of the foreground audio signal; and one or more processors configured to: perform psychoacoustic audio decoding with respect to the encoded foreground audio signal to obtain a foreground audio signal; determine, when performing the psychoacoustic audio decoding with respect to the encoded foreground audio signal, a first bit allocation for the encoded foreground audio signal; determine, based on the first bit allocation for the encoded foreground audio signal, a second bit allocation for the quantized spatial component; dequantize, based on the second bit allocation for the quantized spatial component, the quantized spatial component to obtain a spatial component; and reconstruct, based on the foreground audio signal and the spatial component, the scene-based audio data.

Clause 2C. The device of clause 1C, wherein the one or more processors are configured to perform the psychoacoustic audio decoding according to an AptX decompression algorithm with respect to the encoded foreground audio signal to obtain the foreground audio signal.

Clause 3C. The device of any combination of clauses 1C and 2C, wherein the one or more processors are configured to: obtain, from the bitstream, a number of bits allocated to a course quantized gain and each of one or more fine quantized residuals, the course quantized gain and the one or more fine quantized residual represent a gain of the foreground audio signal; and determine, based on the number of bits allocated to the course quantized gain and each of the one or more fine quantized residuals, the second bit allocation.

Clause 4C. The device of any combination of clauses 1C-3C, wherein the one or more processors are configured to: determine a spectral perceptual importance of the encoded foreground audio signal relative to a soundfield represented by the scene-based audio data; and determine, based on the spectral perceptual importance, the first bit allocation.

Clause 5C. The device of clause 4C, wherein the one or more processors are configured to: determine, based on the spectral perceptual importance and the number of bits allocated to the course quantized gain, a static spatial bit distribution; determine, based on the number of bits allocated to each of the one or more fine quantized residuals, a dynamic spatial bit distribution; and determine, based on the static spatial bit distribution and the dynamic spatial bit distribution, the second bit allocation.

Clause 6C. The device of any combination of clauses 1C-5C, wherein the scene-based audio data comprises ambisonic coefficients corresponding to an order greater than one.

Clause 7C. The device of any combination of clauses 1C-5C, wherein the scene-based audio data comprises audio data defined in a spherical harmonic domain.

Clause 8C. The device of any combination of clauses 1C-7C, wherein the foreground audio signal comprises a foreground audio signal defined in the spherical harmonic domain, and wherein the spatial component comprises a spatial component defined in the spherical harmonic domain.

Clause 9C. The device of any combination of clauses 1C-8C, wherein the one or more processors are further configured to: render the scene-based audio data to one or more speaker feeds; and reproduce, based on the speaker feeds, a soundfield represented by the scene-based audio data.

Clause 10C. The device of any combination of clauses 1C-8C, wherein the one or more processors are further configured to render the scene-based audio data to one or more speaker feeds, and wherein the device comprises one or more speakers configured to reproduce, based on the speaker feeds, a soundfield represented by the scene-based audio data.

Clause 11C. The device of any combination of clauses 1C-10C, wherein the scene-based audio data includes mixed-order ambisonic audio data.

Clause 12C. A method of decoding a bitstream representative of scene-based audio data, the method comprising: obtaining, from the bitstream, an encoded foreground audio signal and a corresponding quantized spatial component that defines the spatial characteristics of the encoded foreground audio signal; performing psychoacoustic audio decoding with respect to the encoded foreground audio signal to obtain a foreground audio signal; determining, when performing psychoacoustic audio decoding with respect to the encoded foreground audio signal, a first bit allocation for the encoded foreground audio signal; determining, based on the first bit allocation for the encoded foreground audio signal, a second bit allocation for the quantized spatial component; dequantizing, based on the second bit allocation for the quantized spatial component, the quantized spatial component to obtain a spatial component; and reconstructing, based on the foreground audio signal and the spatial component, the scene-based audio data.

Clause 13C. The method of clause 12C, wherein performing the psychoacoustic audio decoding comprises performing the psychoacoustic audio decoding according to an AptX decompression algorithm with respect to the encoded foreground audio signal to obtain the foreground audio signal.

Clause 14C. The method of any combination of clauses 12C and 13C, wherein determining the second bit allocation comprises: obtaining, from the bitstream, a number of bits allocated to a course quantized gain and each of one or more fine quantized residuals, the course quantized gain and the one or more fine quantized residual represent a gain of the foreground audio signal; and determining, based on the number of bits allocated to the course quantized gain and each of the one or more fine quantized residuals, the second bit allocation.

Clause 15C. The method of any combination of clauses 12C-14C, wherein determining the first bit allocation comprises: determining a spectral perceptual importance of the encoded foreground audio signal relative to a soundfield represented by the scene-based audio data; and determining, based on the spectral perceptual importance, the first bit allocation.

Clause 16C. The method of clause 15C, wherein determining the second bit allocation comprises: determining, based on the spectral perceptual importance and the number of bits allocated to the course quantized gain, a static spatial bit distribution; determining, based on the number of bits allocated to each of the one or more fine quantized residuals, a dynamic spatial bit distribution; and determining, based on the static spatial bit distribution and the dynamic spatial bit distribution, the second bit allocation.

Clause 17C. The method of any combination of clauses 12C-16C, wherein the scene-based audio data comprises ambisonic coefficients corresponding to an order greater than one.

Clause 18C. The method of any combination of clauses 12C-16C, wherein the scene-based audio data comprises audio data defined in a spherical harmonic domain.

Clause 19C. The method of any combination of clauses 12C-18C, wherein the foreground audio signal comprises a foreground audio signal defined in the spherical harmonic domain, and wherein the spatial component comprises a spatial component defined in the spherical harmonic domain.

Clause 20C. The method of any combination of clauses 12C-19C, further comprising: rendering the scene-based audio data to one or more speaker feeds; and reproducing, based on the speaker feeds, a soundfield represented by the scene-based audio data.

Clause 21C. The method of any combination of clauses 12C-20C, wherein the scene-based audio data includes mixed-order ambisonic audio data.

Clause 22C. A device configured to decode a bitstream representative of encoded scene-based audio data, the device comprising: means for obtaining, from the bitstream, an encoded foreground audio signal and a corresponding quantized spatial component that defines the spatial characteristics of the encoded foreground audio signal; means for performing psychoacoustic audio decoding with respect to the encoded foreground audio signal to obtain a foreground audio signal; means for determining, when performing psychoacoustic audio decoding with respect to the encoded foreground audio signal, a first bit allocation for the encoded foreground audio signal; means for determining, based on the first bit allocation for the encoded foreground audio signal, a second bit allocation for the quantized spatial component; means for dequantizing, based on the second bit allocation for the quantized spatial component, the quantized spatial component to obtain a spatial component; and means for reconstructing, based on the foreground audio signal and the spatial component, the scene-based audio data.

Clause 23C. The device of clause 22C, wherein the means for performing the psychoacoustic audio decoding comprises means for performing the psychoacoustic audio decoding according to an AptX decompression algorithm with respect to the encoded foreground audio signal to obtain the foreground audio signal.

Clause 24C. The device of any combination of clauses 22C and 23C, wherein the means for determining the second bit allocation comprises: means for obtaining, from the bitstream, a number of bits allocated to a course quantized gain and each of one or more fine quantized residuals, the course quantized gain and the one or more fine quantized residual represent a gain of the foreground audio signal; and means for determining, based on the number of bits allocated to the course quantized gain and each of the one or more fine quantized residuals, the second bit allocation.

Clause 25C. The device of any combination of clauses 22C-24C, wherein the means for determining the first bit allocation comprises: means for determining a spectral perceptual importance of the encoded foreground audio signal relative to a soundfield represented by the scene-based audio data; and means for determining, based on the spectral perceptual importance, the first bit allocation.

Clause 26C. The device of clause 25C, wherein the means for determining the second bit allocation comprises: means for determining, based on the spectral perceptual importance and the number of bits allocated to the course quantized gain, a static spatial bit distribution; and means for determining, based on the number of bits allocated to each of the one or more fine quantized residuals, a dynamic spatial bit distribution; and determining, based on the static spatial bit distribution and the dynamic spatial bit distribution, the second bit allocation.

Clause 27C. The device of any combination of clauses 22C-26C, wherein the scene-based audio data comprises ambisonic coefficients corresponding to an order greater than one.

Clause 28C. The device of any combination of clauses 22C-26C, wherein the scene-based audio data comprises audio data defined in a spherical harmonic domain.

Clause 29C. The device of any combination of clauses 22C-28C, wherein the foreground audio signal comprises a foreground audio signal defined in the spherical harmonic domain, and wherein the spatial component comprises a spatial component defined in the spherical harmonic domain.

Clause 30C. The device of any combination of clauses 22C-29C, further comprising: means for rendering the scene-based audio data to one or more speaker feeds; and means for reproducing, based on the speaker feeds, a soundfield represented by the scene-based audio data.

Clause 31C. The device of any combination of clauses 22C-30C, wherein the scene-based audio data includes mixed-order ambisonic audio data.

Clause 32C. A non-transitory computer-readable storage medium having stored thereon instructions that, when executed, cause one or more processors to: obtain, from a bitstream representative of scene-based audio data, an encoded foreground audio signal and a corresponding quantized spatial component that defines the spatial characteristics of the encoded foreground audio signal; perform psychoacoustic audio decoding with respect to the encoded foreground audio signal to obtain a foreground audio signal; determine, when performing psychoacoustic audio decoding with respect to the encoded foreground audio signal, a first bit allocation for the encoded foreground audio signal; determine, based on the first bit allocation for the encoded foreground audio signal, a second bit allocation for the quantized spatial component; dequantize, based on the second bit allocation for the quantized spatial component, the quantized spatial component to obtain a spatial component; and reconstruct, based on the foreground audio signal and the spatial component, the scene-based audio data.

In some contexts, such as broadcasting contexts, the audio encoding device may be split into a spatial audio encoder, which performs a form of intermediate compression with respect to the ambisonic representation that includes gain control, and a psychoacoustic audio encoder 26 (which may also be referred to as a "perceptual audio encoder 26") that performs perceptual audio compression to reduce redundancies in data between the gain normalized transport channels.

In addition, the foregoing techniques may be performed with respect to any number of different contexts and audio ecosystems and should not be limited to any of the contexts or audio ecosystems described above. A number of example contexts are described below, although the techniques should be limited to the example contexts. One example audio ecosystem may include audio content, movie studios, music studios, gaming audio studios, channel-based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel-based audio content (e.g., in 2.0, 5.1, and 7.1) such as by using a digital audio workstation (DAW). The music studios may output channel-based audio content (e.g., in 2.0, and 5.1) such as by using a DAW. In either case, the coding engines may receive and encode the channel-based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel-based audio content for output by the delivery systems. Another example context in which the techniques may be performed comprises an audio ecosystem that may include broadcast recording audio objects, professional audio systems, consumer on-device capture, ambisonic audio format, on-device rendering, consumer audio, TV, and accessories, and car audio systems.

The broadcast recording audio objects, the professional audio systems, and the consumer on-device capture may all code their output using ambisonic audio format. In this way, the audio content may be coded using the ambisonic audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.), such as audio playback system 16.

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a soundfield. For instance, the mobile device may acquire a soundfield via the wired and/or wireless acquisition devices and/or the on-device surround sound capture (e.g., a plurality of microphones integrated into the mobile device). The mobile device may then code the acquired soundfield into the ambisonic coefficients for playback by one or more of the playback elements. For instance, a user of the mobile device may record (acquire a soundfield of) a live event (e.g., a meeting, a conference, a play, a concert, etc.), and code the recording into ambisonic coefficients.

The mobile device may also utilize one or more of the playback elements to playback the ambisonic coded soundfield. For instance, the mobile device may decode the ambisonic coded soundfield and output a signal to one or more of the playback elements that causes the one or more of the playback elements to recreate the soundfield. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D soundfield and playback the same 3D soundfield at a later time. In some examples, the mobile device may acquire a 3D soundfield, encode the 3D soundfield into HOA, and transmit the encoded 3D soundfield to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of ambisonic signals. For instance, the one or more DAWs may include ambisonic plugins and/or tools which may be configured to operate with (e.g., work with) one or more game audio systems. In some examples, the game studios may output new stem formats that support HOA. In any case, the game studios may output coded audio content to the rendering engines which may render a soundfield for playback by the delivery systems.

The techniques may also be performed with respect to exemplary audio acquisition devices. For example, the techniques may be performed with respect to an Eigen microphone which may include a plurality of microphones that are collectively configured to record a 3D soundfield. In some examples, the plurality of microphones of Eigen microphone may be located on the surface of a substantially spherical ball with a radius of approximately 4 cm. In some examples, the audio encoding device 20 may be integrated into the Eigen microphone so as to output a bitstream 21 directly from the microphone.

Another exemplary audio acquisition context may include a production truck which may be configured to receive a signal from one or more microphones, such as one or more Eigen microphones. The production truck may also include an audio encoder, such as the spatial audio encoding device 24 of FIG. 1.

The mobile device may also, in some instances, include a plurality of microphones that are collectively configured to record a 3D soundfield. In other words, the plurality of microphone may have X, Y, Z diversity. In some examples, the mobile device may include a microphone which may be rotated to provide X, Y, Z diversity with respect to one or more other microphones of the mobile device. The mobile device may also include an audio encoder, such as the audio encoder 22 of FIG. 1.

A ruggedized video capture device may further be configured to record a 3D soundfield. In some examples, the ruggedized video capture device may be attached to a helmet of a user engaged in an activity. For instance, the ruggedized video capture device may be attached to a helmet of a user whitewater rafting. In this way, the ruggedized video capture device may capture a 3D soundfield that represents the action all around the user (e.g., water crashing behind the user, another rafter speaking in front of the user, etc. . . . ).

The techniques may also be performed with respect to an accessory enhanced mobile device, which may be configured to record a 3D soundfield. In some examples, the mobile device may be similar to the mobile devices discussed above, with the addition of one or more accessories. For instance, an Eigen microphone may be attached to the above noted mobile device to form an accessory enhanced mobile device. In this way, the accessory enhanced mobile device may capture a higher quality version of the 3D soundfield than just using sound capture components integral to the accessory enhanced mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a 3D soundfield. Moreover, in some examples, headphone playback devices may be coupled to a decoder 32 (which is another way to refer to the audio decoding device 32 of FIG. 1) via either a wired or a wireless connection. In accordance with one or more techniques of this disclosure, a single generic representation of a soundfield may be utilized to render the soundfield on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front speakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a soundfield may be utilized to render the soundfield on any of the foregoing playback environments. Additionally, the techniques of this disclosure enable a rendered to render a soundfield from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the 3D soundfield of the sports game may be acquired (e.g., one or more Eigen microphones may be placed in and/or around the baseball stadium), ambisonic coefficients corresponding to the 3D soundfield may be obtained and transmitted to a decoder, the decoder may reconstruct the 3D soundfield based on the ambisonic coefficients and output the reconstructed 3D soundfield to a renderer, the renderer may obtain an indication as to the type of playback environment (e.g., headphones), and render the reconstructed 3D soundfield into signals that cause the headphones to output a representation of the 3D soundfield of the sports game.

In each of the various instances described above, it should be understood that the audio encoding device 22 may perform a method or otherwise comprise means to perform each step of the method for which the audio encoding device 22 is configured to perform In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio encoding device 20 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media.

Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, as used herein, "A and/or B" means "A or B", or both "A and B."

Various aspects of the techniques have been described. These and other aspects of the techniques are within the scope of the following claims.

The invention claimed is:

1. A device configured to encode scene-based audio data, the device comprising:
   a memory configured to store scene-based audio data; and
   one or more processors configured to:
   perform spatial audio encoding that includes application of a linear invertible transform with respect to the scene-based audio data to obtain a foreground audio signal and a corresponding spatial component, the spatial component defining spatial characteristics of the foreground audio signal;
   perform psychoacoustic audio encoding with respect to the foreground audio signal to obtain an encoded foreground audio signal;
   determine, when performing psychoacoustic audio encoding with respect to the foreground audio signal, a first bit allocation for the foreground audio signal;
   determine, based on the first bit allocation for the foreground audio signal, a second bit allocation for the spatial component, wherein, to determine the second bit allocation, the one or more processors are configured to:
      perform a shape and gain analysis with respect to the foreground audio signal to obtain a shape and a gain representative of the foreground audio signal;
      perform quantization with respect to the gain to obtain a course quantized gain and one or more fine quantized residuals; and
      determine, based on a number of bits allocated to the course quantized gain and each of the one or more fine quantized residuals, the second bit allocation;
   quantize, based on the second bit allocation for the spatial component, the spatial component to obtain a quantized spatial component; and
   specify, in a bitstream, the encoded foreground audio signal and the quantized spatial component.

2. The device of claim 1, wherein the one or more processors are configured to perform the psychoacoustic audio encoding according to a compression algorithm with respect to the foreground audio signal to obtain the encoded foreground audio signal.

3. The device of claim 1, wherein the one or more processors are configured to:
   determine a spectral perceptual importance of the foreground audio signal relative to a soundfield represented by the scene-based audio data; and
   determine, based on the spectral perceptual importance, the first bit allocation.

4. The device of claim 3, wherein the one or more processors are configured to:
   determine, based on the spectral perceptual importance and the number of bits allocated to the course quantized gain, a static spatial bit distribution;
   determine, based on the number of bits allocated to each of the one or more fine quantized residuals, a dynamic spatial bit distribution; and
   determine, based on the static spatial bit distribution and the dynamic spatial bit distribution, the second bit allocation.

5. The device of claim 1, wherein the scene-based audio data comprises ambisonic coefficients corresponding to an order greater than one.

6. The device of claim 1, wherein the scene-based audio data comprises ambisonic coefficients corresponding to an order greater than zero.

7. The device of claim 1, wherein the scene-based audio data comprises audio data defined in a spherical harmonic domain.

8. The device of claim 7,
   wherein the foreground audio signal comprises a foreground audio signal defined in the spherical harmonic domain, and
   wherein the spatial component comprises a spatial component defined in the spherical harmonic domain.

9. The device of claim 1, wherein the scene-based audio data includes mixed-order ambisonic audio data.

10. The device of claim 1, further comprising a microphone configured to capture the scene-based audio data.

11. A method of encoding scene-based audio data, the method comprising:
   performing spatial audio encoding that includes application of a linear invertible transform with respect to the scene-based audio data to obtain a foreground audio signal and a corresponding spatial component, the spatial component defining spatial characteristics of the foreground audio signal;
   performing psychoacoustic audio encoding with respect to the foreground audio signal to obtain an encoded foreground audio signal;
   determining, when performing psychoacoustic audio encoding with respect to the foreground audio signal, a first bit allocation for the foreground audio signal;

determining, based on the first bit allocation for the foreground audio signal, a second bit allocation for the spatial component, wherein determining the second bit allocation comprises:

performing a shape and gain analysis with respect to the foreground audio signal to obtain a shape and a gain representative of the foreground audio signal;

performing quantization with respect to the gain to obtain a course quantized gain and one or more fine quantized residuals; and determining, based on a number of bits allocated to the course quantized gain and each of the one or more fine quantized residuals, the second bit allocation;

quantizing, based on the second bit allocation for the spatial component, the spatial component to obtain a quantized spatial component; and specifying, in a bitstream, the encoded foreground audio signal and the quantized spatial component.

12. A device configured to decode a bitstream representative of encoded scene-based audio data, the device comprising:

a memory configured to store the bitstream, the bitstream including an encoded foreground audio signal and a corresponding quantized spatial component that defines spatial characteristics of the foreground audio signal, the encoded foreground audio signal and the corresponding spatial component obtained through application of a linear invertible transform; and one or more processors configured to:

perform psychoacoustic audio decoding with respect to the encoded foreground audio signal to obtain a foreground audio signal;

determine, when performing the psychoacoustic audio decoding with respect to the encoded foreground audio signal, a first bit allocation for the encoded foreground audio signal;

determine, based on the first bit allocation for the encoded foreground audio signal, a second bit allocation for the quantized spatial component, wherein, to determine the second bit allocation, the one or more processors are configured to:

obtain, from the bitstream, a number of bits allocated to a course quantized gain and each of one or more fine quantized residuals, the course quantized gain and the one or more fine quantized residual represent a gain of the foreground audio signal; and determine, based on the number of bits allocated to the course quantized gain and each of the one or more fine quantized residuals, the second bit allocation;

dequantize, based on the second bit allocation for the quantized spatial component, the quantized spatial component to obtain a spatial component; and reconstruct, based on the foreground audio signal and the spatial component, the scene-based audio data.

13. The device of claim 12, wherein the one or more processors are configured to perform the psychoacoustic audio decoding according to a decompression algorithm with respect to the encoded foreground audio signal to obtain the foreground audio signal.

14. The device of claim 12, wherein the one or more processors are configured to:

determine a spectral perceptual importance of the encoded foreground audio signal relative to a soundfield represented by the scene-based audio data; and determine, based on the spectral perceptual importance, the first bit allocation.

15. The device of claim 14, wherein the one or more processors are configured to:

determine, based on the spectral perceptual importance and the number of bits allocated to the course quantized gain, a static spatial bit distribution;

determine, based on the number of bits allocated to each of the one or more fine quantized residuals, a dynamic spatial bit distribution; and determine, based on the static spatial bit distribution and the dynamic spatial bit distribution, the second bit allocation.

16. The device of claim 12, wherein the scene-based audio data comprises ambisonic coefficients corresponding to an order greater than one.

17. The device of claim 12, wherein the scene-based audio data comprises audio data defined in a spherical harmonic domain.

18. The device of claim 17, wherein the foreground audio signal comprises a foreground audio signal defined in the spherical harmonic domain, and wherein the spatial component comprises a spatial component defined in the spherical harmonic domain.

19. The device of claim 12, wherein the one or more processors are further configured to:

render the scene-based audio data to one or more speaker feeds; and reproduce, based on the speaker feeds, a soundfield represented by the scene-based audio data.

20. The device of claim 12, wherein the one or more processors are further configured to render the scene-based audio data to one or more speaker feeds, and wherein the device comprises one or more speakers configured to reproduce, based on the speaker feeds, a soundfield represented by the scene-based audio data.

21. The device of claim 12, wherein the scene-based audio data includes mixed-order ambisonic audio data.

22. The device of claim 12, wherein the one or more processors are further configured to:

render the scene-based audio data to one or more speaker feeds; and output the speaker feeds to one or more speakers to reproduce, based on the speaker feeds, a soundfield represented by the scene-based audio data.

23. A method of decoding a bitstream representative of scene-based audio data, the method comprising:

obtaining, from the bitstream, an encoded foreground audio signal and a corresponding quantized spatial component that defines the spatial characteristics of the encoded foreground audio signal, the encoded foreground audio signal and the corresponding spatial component obtained through application of a linear invertible transform;

performing psychoacoustic audio decoding with respect to the encoded foreground audio signal to obtain a foreground audio signal;

determining, when performing psychoacoustic audio decoding with respect to the encoded foreground audio signal, a first bit allocation for the encoded foreground audio signal;

determining, based on the first bit allocation for the encoded foreground audio signal, a second bit allocation for the quantized spatial component, wherein determining the second bit allocation comprises:

obtaining, from the bitstream, a number of bits allocated to a course quantized gain and each of one or more fine quantized residuals, the course quantized gain and the one or more fine quantized residual represent a gain of the foreground audio signal; and determining, based on the number of bits allocated to the course quantized gain and each of the one or more fine quantized residuals, the second bit allocation;

dequantizing, based on the second bit allocation for the quantized spatial component, the quantized spatial component to obtain a spatial component; and reconstructing, based on the foreground audio signal and the spatial component, the scene-based audio data.

* * * * *